United States Patent
Smith et al.

(10) Patent No.: US 12,522,381 B2
(45) Date of Patent: *Jan. 13, 2026

(54) MINIATURIZED GREEN END-BURNING HYBRID PROPULSION SYSTEM FOR CUBESATS

(71) Applicant: Utah State University Space Dynamics Laboratory, North Logan, UT (US)

(72) Inventors: Tyson Smith, Logan, UT (US); Zachary Lewis, Logan, UT (US); Kurt Olsen, Logan, UT (US); Marc Anthony Bulcher, Fort Worth, TX (US); Stephen Whitmore, Logan, UT (US)

(*) Notice: Subject to any disclaimer, the term of this patent is extended or adjusted under 35 U.S.C. 154(b) by 548 days.

This patent is subject to a terminal disclaimer.

(21) Appl. No.: 17/391,843

(22) Filed: Aug. 2, 2021

(65) Prior Publication Data

US 2022/0315252 A1    Oct. 6, 2022

Related U.S. Application Data

(60) Provisional application No. 63/059,791, filed on Jul. 31, 2020.

(51) Int. Cl.
| | |
|---|---|
| *F02K 9/72* | (2006.01) |
| *B64G 1/10* | (2006.01) |
| *B64G 1/40* | (2006.01) |
| *F02K 9/95* | (2006.01) |

(52) U.S. Cl.
CPC ............... *B64G 1/404* (2013.01); *B64G 1/10* (2013.01); *F02K 9/72* (2013.01); *F02K 9/95* (2013.01)

(58) Field of Classification Search
CPC .................................. F02K 9/72; B64G 1/404
See application file for complete search history.

(56) References Cited

U.S. PATENT DOCUMENTS

| | | | |
|---|---|---|---|
| 4,795,938 | A | 1/1989 | Meredith |
| 5,099,645 | A | 3/1992 | Schuler |
| 5,715,675 | A | 2/1998 | Smith |

(Continued)

FOREIGN PATENT DOCUMENTS

| | | | |
|---|---|---|---|
| DK | 2524727 A1 | 5/2011 | |
| NL | 1533511 A1 | 11/2003 | |

OTHER PUBLICATIONS

Sakurai "Fuel regression behavior of swirling-injection end-burning hybrid rocket engine" (Year: 2019).*

(Continued)

*Primary Examiner* — Lorne E Meade

(57) ABSTRACT

A hybrid propulsion system includes a housing, at least two electrodes, a solid-grain fuel material, a combustion chamber, an oxidizer port, and a nozzle. The housing has a first end and a second end and defines a cavity. The electrodes extend into the cavity. The fuel material is free of an oxidizer and is positioned in the cavity. The fuel material has a combustion surface and is exposed to the electrodes. The combustion chamber is defined between the combustion surface and the second end. The oxidizer port provides a flow of oxidizer to the combustion chamber. The nozzle is positioned at the second end. Combustion of the fuel material in the combustion chamber may be dominated by radiative heat transfer.

10 Claims, 18 Drawing Sheets

(56) References Cited

U.S. PATENT DOCUMENTS

| | | | |
|---|---|---|---|
| 5,892,319 A | 4/1999 | Rossi | |
| 6,058,697 A | 5/2000 | Smith | |
| 6,393,830 B1 | 5/2002 | Hamke | |
| 6,779,335 B2 | 8/2004 | Herdy | |
| 7,341,002 B1* | 3/2008 | Baker | F42B 12/36 |
| | | | 102/367 |
| 7,716,912 B2 | 5/2010 | Cover | |
| 7,788,900 B2* | 9/2010 | Dulligan | F02K 9/94 |
| | | | 60/254 |
| 7,921,638 B2* | 4/2011 | Kuo | C06B 47/02 |
| | | | 60/251 |
| 8,015,920 B1 | 9/2011 | Wilkinson | |
| 8,225,507 B2 | 7/2012 | Fuller | |
| 8,327,617 B2 | 12/2012 | Gustofsson | |
| 8,539,753 B2 | 9/2013 | Macklin | |
| 9,086,033 B2* | 7/2015 | Dushku | B33Y 70/00 |
| 10,527,004 B2 | 1/2020 | Whitmore | |
| 10,563,617 B2* | 2/2020 | Villarreal | F02K 9/28 |
| 10,774,789 B2 | 9/2020 | Whitmore | |
| 11,407,531 B2* | 8/2022 | Smith | B64G 1/404 |
| 11,724,829 B2* | 8/2023 | Smith | F02K 9/72 |
| | | | 244/171.3 |
| 2002/0121081 A1 | 9/2002 | Cesaroni et al. | |
| 2003/0136111 A1 | 7/2003 | Kline et al. | |
| 2004/0068979 A1 | 4/2004 | Kline | |
| 2006/0213181 A1 | 9/2006 | Sarigul-Klijn et al. | |
| 2009/0217525 A1 | 9/2009 | Fuller | |
| 2009/0217642 A1 | 9/2009 | Fuller | |
| 2012/0060468 A1 | 3/2012 | Dushku et al. | |
| 2012/0285016 A1 | 11/2012 | Fuller | |
| 2013/0031888 A1 | 2/2013 | Fuller | |
| 2013/0042596 A1 | 2/2013 | Fuller | |
| 2014/0026537 A1 | 1/2014 | Eilers | |
| 2016/0032867 A1* | 2/2016 | Mahaffy | F02K 9/97 |
| | | | 60/770 |
| 2016/0356245 A1 | 12/2016 | Danforth | |
| 2017/0073280 A1 | 3/2017 | Jones | |
| 2017/0234268 A1 | 8/2017 | Summers | |
| 2020/0003159 A1* | 1/2020 | Karp | F02K 9/95 |

OTHER PUBLICATIONS

Whitmore "Advantages of Using Additive Manufacturing to Build "Green" Fuels for Hybrid Propulsion" (Year: 2017).*
Whitmore et al, "Thrust Augmentation of an Additively Manufactured Hybrid Rocket System Using Secondary H2O2 Injection", AIAA Propulsion and Energy Forum and Exposition, Aug. 26, 2019, Indianapolis, IN, USA.
Marshall et al, "Thrust Augmented Nozzle for a Hybrid Rocket with a Helical Fuel Point", 53rd AIAA/SAE/ASEE Joint Propulsion Conference, Jul. 7, 2017, Atlanta, GA, USA.
Whitmore et al, "High Regression Rate Hybrid Rocket Fuel Grains with Helical Port Structures", Journal of Propulsion and Power, 2015, pp. 1727-1738, vol. 31, No. 6.
Whitmore & Walker, "Engineering Model for Hybrid Fuel Regression Rate Amplification Using Helical Ports", Journal of Propulsion and Power, 2017, pp. 398-407, vol. 33, No. 2.
Whitmore et al., "High-Performing Hydrogen Peroxide Hybrid Rocket with 3-D Printed and Extruded ABS Fuel", Aeronautics and Aerospace Open Access Journal, Nov. 2018, vol. 2, No. 6.
Whitmore et al., "Development of a Power-Efficient, Restart-Capable Arc Ignitor for Hybrid Rockets", 50th AIAA/ASME/SAE/ASEE Joint Propulsion Conference and Exhibit, Jul. 28, 2014 AIAA-2014-3949, American Institute of Aeronautics and Astronautics, Cleveland OH.
Whitmore, "Direct Ignition of a High Performance Hydrogen Peroxide Hybrid Rocket with 3-D Printed Fuel", Int. J. of Astronautics and Aeronautical Eng., 2019, vol. 4, No. 21.
Lindley, "Performance of Air-Breathing and Rocket Engines for Hypervelocity Aircraft", 4th Congress of the International Council of the Aeronautical Sciences, pp. 941-975.
Wilson et al., Catalytic decomposition of nitrous oxide monopropellant for hybrid motor re-ignition, 47th AIAA/ASME/SAE/ASEE Joint Propulsion Conference & Exhibit, Jul. 31, 2011.
Eilers et al., Development of the regeneratively cooled multiple use plug hybrid (for) nanosats (MUPHyN) motor, 48th AIAA/ASME/SAE/ASEE Joint Propulsion Conference & Exhibit, Jul. 29, 2012.
McCulley, et al., Design and testing of fdm manufactured paraffin-abs hybrid rocket motors, 48th AIAA/ASME/SAE/ASEE Joint Propulsion Conference & Exhibit, Jul. 29, 2012.
Peterson et al., Closed-loop thrust and pressure profile throttling of a nitrous oxide hfpb hybrid rocket motor, 48th AIAA/ASME/SAE/ASEE Joint Propulsion Conference & Exhibit, Jul. 29, 2012.
Whitmore et al., Analytical and experimental comparisons of htpb and abs as hybrid rocket fuels, 47th AIAA/ASME/SAE/ASEE Joint Propulsion Conference & Exhibit, Jul. 31, 2011.
Goldstein, The Greening of Satellite Propulsion, Aerospace America, Feb. 2012.
Safie, F.M., and Fox, E. P., A probabilistic design analysis approach for launch systems, AIAA-1991-1186, 27th AIAA, SAE, ASME, and ASEE, Joint Propulsion Conference, Sacramento, CA, USA; Jun. 24-26, 1991.
Chang, Investigation of Space Launch Vehicle Catastrophic Failures, Journal of Spacecraft and Rockets, vol. 33, No. 2, Mar.-Apr. 1996.
Maggio, G., Space Shuttle Probabilistic Risk Assessment; Methodology and Application, International Symposium on Product Quality and Integrity, Proceedings of the Reliability and Maintainability Symposium, Las Vegas, NV, USA, Jan. 22-25, 1996.
Gibbon et al., Investigation of an Alternative Geometry Hybrid Rocket for Small Spacecraft Orbit Transfer, Tech. rep., Surrey Satellite Technology Ltd, Jul. 27, 2001.
Knuth et al., Solid-Fuel Regression Rate Behavior of Vortex Hybrid Rocket Engines, The Journal of Propulsion and Power, vol. 18, No. 3, pp. 600-609, May-Jun. 2002.
Lemieux, P., Nitrous Oxide Cooling in Hybrid Rocket Nozzles, Progress in Aerospace Sciences, vol. 46 pp. 106-115, Dec. 29, 2009.
Lemieux, P., Development of Reusable Aerospike Nozzle for Hybrid Rocket Motors, 39th AIAA Fluid Dynamics Conference, Jun. 22, 2009.
Grieb, J., Design and Analysis of a Reusable N2O-Cooled Aerospike Nozzle for Labscale Hybrid Rocket Motor Testing, Master's Thesis presented to the Faculty of California Polytechnic State University, Feb. 2012.
Mayer, E., Analysis of Convective Heat Transfer in Rocket Nozzles, ARS Journal, pp. 911-916, 1961.
Gordon, S. & McBride, B. J., "Computer Program for Calculation of Complex Chemical Equilibrium Compositions and Applications I. Analysis," Tech. rep. NASA RP-1311, 1994.
McBride,B. J. & Gordon, S., Computer Program for Calculation of Complex Chemical Equilibrium Compositions and Applications II, Users Manual and Program Description, Tech. rep., NASA RP-1311, Oct. 1994.
Span, R. & Wagner, W., Equations of State for Technical Applications. I. Simultaneously Optimized Forms for Nonpolar and Polar Fluids, International Journal of Thermophysics, vol. 24, No. 1, pp. 1-39, Jan. 1, 2003.
Span, R. & Wagner, W., Equations of State for Technical Applications. II. Results for Nonpolar Fluids, International Journal of Thermophysics, vol. 24, No. 1, pp. 41-109, Jan. 1, 2003.
Span, R. & Wagner, W., Equations of State for Technical Applications. III. Results for Polar Fluids, International Journal of Thermophysics, vol. 24, No. 1, pp. 111-162, Jan. 1, 2003.
Dyer et al., Modeling Feed System Flow Physics for Self Pressurizing Propellants, 43rd AIAA/ASME/SAE/ASEE Joint Propulsion Conference & Exhibit, Jul. 8, 2007.
Whitmore, Additiviely Manufactured Acrylonitirile-Butadiene-Styrene-Nitrous-Oxide Hybrid Rocket Motor with Electrostatic Igniter, Journal of Propulsion and Power, Apr. 28, 2015, pp. 1217-1220, vol. 31, No. 4.
USPTO, Non-Final Office Action for U.S. Appl. No. 13/953,877 for "Multiple Use Hybrid Rocket Motor" filed Jul. 30, 2013, Office Action Mailing Date of Jan. 20, 2016.

(56) References Cited

OTHER PUBLICATIONS

Eilers et al., Analytical and Experimental Evaluation of Aerodynamic Thrust Vectoring on an Aerospike Nozzle, 46th AIAA/ASME/SAE/ASEE Joint Propulsion Conference & Exhibit, Jul. 25, 2010, Nashville, TN.
Approctech, Pyro Free Ignition of Hybrid Rocket Motor with Wax/Epoxy Resin Grain, YouTube.com, Nov. 9, 2010.
Whitmore et al., "Enhanced performance of an enriched air/ABS hybrid rocket using oxidizing fuel additives". 54th AIAA/SAE/ASEE Joint Propulsion Conference. Jul. 9, 2018. Cincinnati, Ohio.
Whitmore et al., "A green hybrid thruster user moderately enriched compressed air as the oxidizer." 54th AIAA/SAE/ASEE Joint Propulsion Conference. Jul. 9, 2018. Cincinnati, Ohio.
Eilers et al., Development and testing of regeneratively cooled multiple use plug hybrid (for) nanosats (MUPHyN) motor, 48th AIAA/ASME/SAE/ASEE Joint Propulsion Conference & Exhibit, Jul. 29, 2012.
USPTO, Final Office Action for U.S. Appl. No. 14/802,537 for "Restartable Ignition Devices, Systems, and Methods Thereof" filed Jul. 7, 2015 Office Action Mailing Date of Aug. 31, 2018.
USPTO, Final Office Action for U.S. Appl. No. 14/802,537 for "Restartable Ignition Devices, Systems, and Methods Thereof" filed Jul. 17, 2015, Office Action Mailing Date of May 23, 2019.
Merkley, Effects of Radiation Heating on Additively Printed Hybrid Fuel Grain Oxidizer-to-fuel Ratio Shift, 2016. All Graduate Theses and Dissertations. 5230, https://digitalcommons.usu.edu/etd/5230.
Lestrade, et al., Development and Test of an Innovative Hybrid Rocket Combustion Chamber, 2015, 7th European Conference for Aeronautics and Space Sciences (EUCASS), DOI: 10.13009/EUCASS2017-414.
Hamnis et al., Characterization of Candle Flames, 2015, Journal of Fire Protection Engineering, vol. 15, pp. 265-283.
Haag, Gary, Alternative Geometry Hybrid Rockets for Spacecraft Orbit Transfer, 2001, PhD. Thesis for Surrey Space Centre School of Electronic Engineering, Information Technology and Mathematics, pp. 1-120.
Haag, Gary, Alternative Geometry Hybrid Rockets for Spacecraft Orbit Transfer, 2001, PhD. Thesis for Surrey Space Centre School of Electronic Engineering, Information Technology and Mathematics, pp. 121-240.
Zilliac et al., Hybrid Rocket Fuel Regression Rate Data and Modeling, Jul. 9, 2006, 42nd AIAA/ASME/SAE/ASEE Joint Propulsion Conference & Exhibit, AIAA 2006-4504.
USPTO, Non-Final Office Action to U.S. Appl. No. 17/691,614, Dec. 15, 2022.
Tyson et al., Response Amendment to Non-Final Office Action to U.S. Appl. No. 17/691,614, Feb. 28, 2023.
Whitmore et al., Radiation Heating Effects on Oxidizer-to-Fuel Ratio of Additively Manufactured Hybrid Rocket Fuels, Journal of Propulsion and Power, Jul. 4, 2019.

* cited by examiner

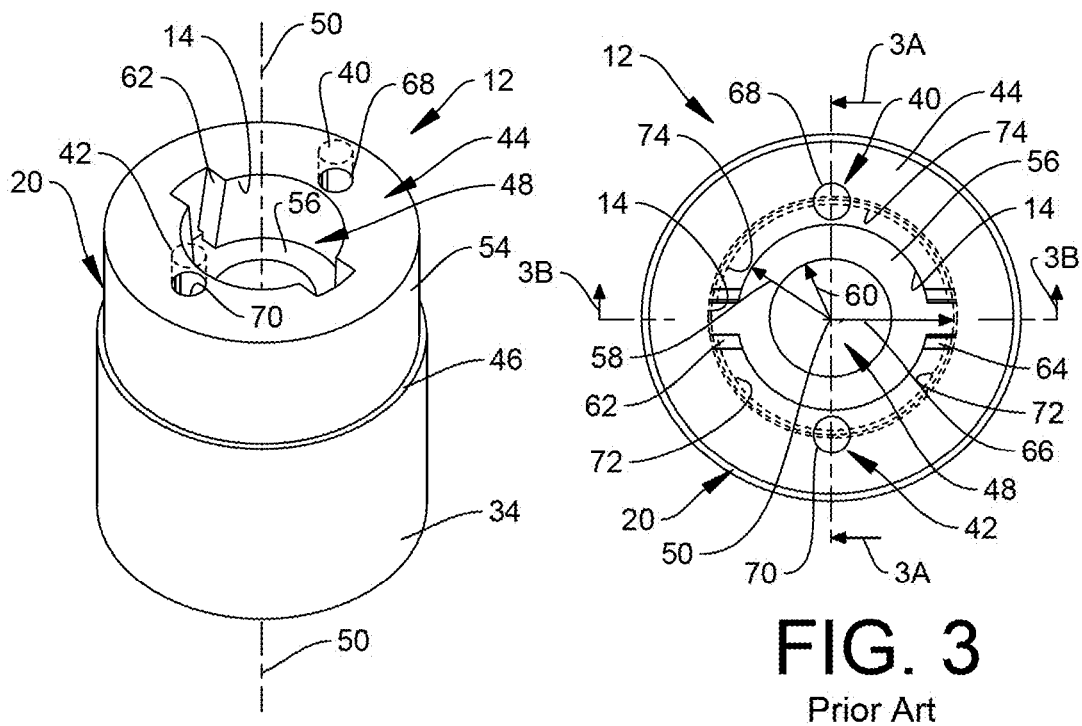
FIG. 2
Prior Art
FIG. 3
Prior Art
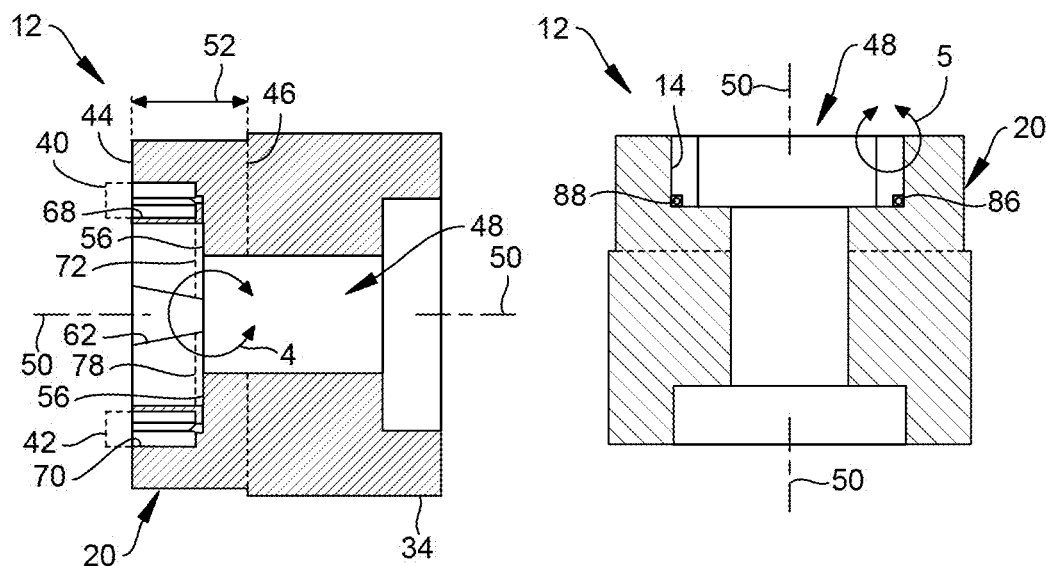
FIG. 3A
Prior Art
FIG. 3B
Prior Art

MINIATURIZED GREEN END-BURNING HYBRID PROPULSION SYSTEM FOR CUBESATS

RELATED APPLICATIONS

This patent application claims the benefit of U.S. Provisional Application 63/059,791, filed Jul. 31, 2020 and entitled "Miniaturized Green End-Burning Hybrid Propulsion System for Cubesats," which is incorporated herein by reference in its entirety.

TECHNICAL FIELD

The present invention relates generally to hybrid rocket systems and, more specifically, to devices, systems and methods of an ignition and combustion portion of a hybrid rocket system, and particularly a small-scale hybrid rocket system.

BACKGROUND

The current state of the art for hybrid rocket ignition systems is largely based on pyrotechnic ignition methods. These methods have serious shortcomings including the inability to initiate multiple restarts using a single device, thus, limiting the applicability of the hybrid rocket. Other shortcomings include significant physical and environmental hazards. For example, making rockets safer, less toxic, and less explosive comes at a significant cost. As the propellant materials become less volatile, they also become increasingly difficult to ignite. Combustion of hybrid propellant must be initiated by an igniter that provides sufficient heat to cause pyrolysis of the solid fuel grain at the head end of the motor, while simultaneously providing sufficient residual energy to overcome the combustion activation energy to initiate combustion. Thus, hybrid rockets have typically used large, high output pyrotechnic charges to initiate combustion. Such igniters are capable of producing very high-enthalpy outputs, but are extremely susceptible to hazards of electromagnetic radiation and present significant operational hazards. Most importantly, such pyrotechnic igniters are designed as "one-shot" devices that do not allow multiple restart capability.

Due to the lack of a reliable on-demand ignition system, hybrid rockets have never been seriously considered as a viable alternative for in-space propulsion. Advancements related to 3D printable plastics as alternatives to legacy solid rocket binders like HTPB has made it possible to manufacture a structural matrix with unique electrical breakdown properties. This discovery has allowed for the development of a unique on-demand ignition technology for hybrid rockets.

In the current CubeSat market, there does not exist a commercial off the shelf (COTS) propulsion system with flight heritage that has thrust levels greater than tens of millinewtons with specific impulse (Isp) levels greater than 70 seconds. Electric propulsion systems provide very high Isp but low thrust levels. The kinetic power per unit thrust surrounding electric propulsion systems are typically in the range of 10-100 W/mN$^3$ depending on selected type. These large power requirements, in addition to the low thrust of electric propulsion, either limit the mission CONOPS or extend the mission timeframe incurring addition financial expenditures. Cold gas propulsion systems are the opposite of electric systems in terms of performance with Isp levels less than 70 seconds. The low Isp of cold gas systems directly results in large form factors with poor volumetric performance.

The majority of hybrid rockets developed to date are traditional core-burning designs with significantly higher thrust levels than desired for small spacecraft. These designs also require a high length-to-diameter ratio, resulting in a form factor difficult to use in CubeSats or small satellites. Accordingly, there is a technology gap in the current CubeSat market. The gap exists in the "high" thrust and "moderate" specific impulse category. This category is traditionally filled by mono- or bi-propellants.

The technology gap in the CubeSat propulsion market leads to mission limitations including spacecraft attitude control difficulty due to centrally located thrusters, low performing cold gas systems requiring large tanks, and electric propulsion systems with large power requirements. These limitations make several mission types extremely difficult or, in some cases, unsupportable. Such missions include rendezvous, proximity operations, formation flying, and cluster management. A successful demonstration of a system in this technology gap would lead to a compact, highly efficient, and market disrupting propulsion system that would enable CubeSats for use in critical and far-reaching missions.

Dedicated launches of Smallsats have increased recently, thus creating an industry need for a cost effective and high-performance propulsion system. Many satellite developers continue to use multi-million-dollar propulsion systems based on a propellant known as hydrazine. The hybrid propulsion system in development at the Space Dynamics Laboratory aims to address this prohibitive cost requirement to allow more satellite developers an opportunity to incorporate propulsion into their design. Current efforts are being made by AFRL, NASA, and ECAPS to develop non-hydrazine "green" propellants. However, the costs are nearly identical to conventional hydrazine systems. The cost associated with these propulsion systems has led to many Smallsats launching with no propulsion; often restricting the mission CONOPS. In addition to the costs surrounding hydrazine and other "green" propellants are the hazards they pose to personnel.

Hybrid rockets typically consist of moderately benign gaseous or liquid oxidizer and an inert solid fuel. Hybrid rockets possess operational safety and handling advantages when compared to liquid and solid propellent systems. The U.S. Department of Transportation concluded that most hybrid rocket motor designs could be safely stored and operated without risk of explosion or detonation, potentially offering significantly lower operating and integration cost. The inherent design safety of hybrid rockets increases the potential for rideshare opportunities when compared to traditional monopropellant systems.

In order for hybrid rockets to fill the technology gap discussed in the previous section there are two key disadvantages that must be addressed. The first is the difficulty surrounding motor ignition. A key reason why hybrid rockets are considered to be safe is due to the stability of their fuel. This stability makes hybrid rockets difficult to ignite. The hybrid rocket ignition source must provide sufficient heat to vaporize the solid fuel grain at the head end of the motor while simultaneously providing sufficient residual energy to overcome the activation energy of the oxidizers. Hybrid rockets typically use a pyrotechnic device called a "squib" that ignites a secondary solid fuel motor to initialize the combustion of the hybrid motor. These squibs are often susceptible to the hazards of electromagnetic radiation and can present a potential explosion hazard. Also, pyrotechnic ignitors can only be fired once, thus limiting their application as an in-space propulsive device.

The second disadvantage is that the internal motor ballistics of hybrid combustion produce regression rates that are typically 25-30% lower when compared to solid fuel motors of the same thrust and impulse. To make up for the lower regression rate, a higher oxidizer flow rate is required to maintain the same thrust level. This increases the systems oxidizer-to-fuel ratio (O/F) and ultimately results in poor mass impulse performance, erosive fuel burning, nozzle erosion, reduced motor duty cycles, potential combustion instability, and poorer overall performance of the system. To overcome this O/F problem, hybrid rockets are traditionally designed with cylindrical fuel ports that have long length-to-diameter ratios. This high aspect ratio can result in poor volumetric efficiency and thus limit a hybrid motor's application to a customarily volume constrained small satellite.

BRIEF SUMMARY OF THE INVENTION

The inventors of the present disclosure have identified that it would be advantageous to provide a restartable, hybrid rocket system that has thrust levels between tens of millinewtons and about five Newtons with specific impulse (Isp) levels greater than 100 seconds.

Embodiments of the present invention are directed to a low-thrust, end-burn hybrid propulsion system that includes a housing, at least two electrodes, a solid-grain fuel material, a combustion chamber, an oxidizer port, and a nozzle. In embodiments, the housing has a first end and a second end and defines a cavity. The at least two electrodes extend into the cavity. In embodiments, the solid-grain fuel material is free of an oxidizer and is positioned in the cavity. In embodiments, the fuel material also has a combustion surface and is exposed to the at least two electrodes. In embodiments, the combustion chamber is defined between the combustion surface and the second end. In embodiments, the oxidizer port is arranged to provide a flow of oxidizer to the combustion chamber. The nozzle is positioned at the second end. In embodiments, combustion chamber is configured to combust the solid-grain fuel material and oxidizer in a manner dominated by radiative heat transfer.

In embodiments, the low-thrust, end-burn hybrid propulsion system is configured to produce a steady-state thrust between 0.3 and 1.2 N with a specific impulse greater than 100 seconds. The hybrid propulsion system may generate no more than about 5 N of thrust and may have oxidizer flow of no more than about 5 g/s. The fuel material may include a plurality of flat layers that provide ridges along the combustion surface, the electrodes may be configured to concentrate an electrical charge on the ridges, which may act as micro-electrodes that produce localized electrical arcing thereon and ignite the combustion surface of the fuel material. The fuel material at the combustion surface may be initially consumed or removed through combustion of the fuel material, a newly exposed internal surface of the fuel material may have newly exposed ridges that act as newly exposed micro-electrodes that produce localized electrical arcing thereon and may re-ignite the newly exposed combustion surface. The fuel material may include a plurality of flat layers formed by an additive manufacturing process. The oxidizer may be gaseous oxygen (GOX), hydrogen peroxide ($H_2O_2$), or nitrous oxide ($N_2O$). The fuel material may include at least one of Acrylonitrile Butadiene Styrene (ABS), Polymethyl methacrylate (PMMA), Polyvinyl Chloride (PVC), and Nylon-12. In embodiments, the hybrid propulsion system may generate thrust in the range of about 0.3 N to about 1.2 N and use no more than about 1 g/s oxidizer.

In another embodiments, a hybrid propulsion system includes a housing having a first end and a second end and defining a cavity, at least two electrodes extending into the cavity, a solid-grain fuel material free of an oxidizer and positioned in the cavity and exposed to the at least two electrodes, the fuel material having a combustion surface, a combustion chamber defined between the combustion surface and the second end, and an oxidizer port arranged to provide a flow of oxidizer to the combustion chamber, a nozzle positioned at the second end. Combustion of the fuel material in the combustion chamber generates thrust of no more than about 1.2 N at an oxidizer flow rate of no more than about 1 g/s.

The combustion may be dominated by radiative heat transfer. The fuel material may include a plurality of flat layers that provide ridges along the combustion surface, and the electrodes may be configured to concentrate an electrical charge on the ridges, which act as micro-electrodes that produce localized electrical arcing thereon and ignite the combustion surface of the fuel material. The fuel material at the combustion surface may be initially consumed or removed through combustion of the fuel material, and a newly exposed internal surface of the fuel material may have newly exposed ridges that act as newly exposed micro-electrodes that produce localized electrical arcing thereon and re-ignite the newly exposed combustion surface. The fuel material may include a plurality of flat layers formed by an additive manufacturing process. The oxidizer may be gaseous oxygen (GOX), hydrogen peroxide ($H_2O_2$), or nitrous oxide ($N_2O$). The fuel material may include at least one of Acrylonitrile Butadiene Styrene (ABS), Polymethyl methacrylate (PMMA), Polyvinyl Chloride (PVC), and Nylon-12. The hybrid propulsion system may generate thrust in the range of about 0.1 N to about 1.2 N. The hybrid propulsion system may use no more than about 5 g/s oxidizer.

In a further embodiment, a method of operating a low-thrust, end-burn hybrid propulsion system includes providing a housing having first and second ends, a solid-grain fuel material positioned in the housing and having a combustion surface and being free of an oxidizer, at least two electrodes positioned in the housing, a combustion chamber defined between the combustion surface and the second end, an oxidizer port, a nozzle positioned at the second end, delivering a flow of oxidizer through the oxidizer port and into the combustion chamber, and igniting the combustion surface with the at least two electrodes to generate a hot-gas, fuel-rich flow through the nozzle to generate thrust. Combustion of the fuel material in the combustion chamber is dominated by radiative heat transfer.

The hybrid propulsion system may generate thrust in the range of about 0.3 N to about 1.2 N. The hybrid propulsion system may generate no more than 1 N of thrust and has oxidizer flow of no more than 1 g/s. The fuel material may include a plurality of flat layers that provide ridges along the combustion surface, and the electrodes may be configured to concentrate an electrical charge on the ridges, which act as micro-electrodes that produce localized electrical arcing thereon and ignite the combustion surface of the fuel material. The fuel material at the combustion surface may be initially consumed or removed through combustion of the fuel material, and a newly exposed internal surface of the fuel material may have newly exposed ridges that act as newly exposed micro-electrodes that produce localized electrical arcing thereon and re-ignite the newly exposed combustion surface.

In another embodiment, a low-thrust core-burn hybrid propulsion system, includes an ignition system at a first end of the core-burn hybrid propulsion system, the ignition system including a housing formed of multiple flat layers by employing fused deposition modeling or three-dimensional printing. The core-burn hybrid propulsion system also includes at least two electrodes extending into the ignition system and a combustion chamber comprising a cylinder formed of solid-grain fuel material and forming a bore therethrough. The combustion chamber has a length and a diameter, the length being smaller than the diameter. The core-burn hybrid propulsion system also includes an oxidizer port arranged to provide a flow of oxidizer to the combustion chamber, a nozzle positioned at the second end of the core-burn hybrid propulsion system. Additionally, the combustion chamber is configured to combust the solid-grain fuel material and oxidizer in a manner dominated by radiative heat transfer.

In embodiments, the low-thrust, core-burn hybrid propulsion system is configured to produce a steady-state thrust between 0.5 and 1 N with a specific impulse greater than 100 seconds.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 2 is a perspective view of an igniter system of a hybrid rocket system, according to another embodiment of the present invention;

FIG. 3 is top view of the igniter system of FIG. 2, according to another embodiment of the present invention;

FIG. 3A is a cross-sectional view of the igniter system taken along section 3A of FIG. 3, according to another embodiment of the present invention;

FIG. 3B is a cross-sectional view of the igniter system taken along section 3B of FIG. 3, according to another embodiment of the present invention;

DETAILED DESCRIPTION OF THE INVENTION

Figure 1:
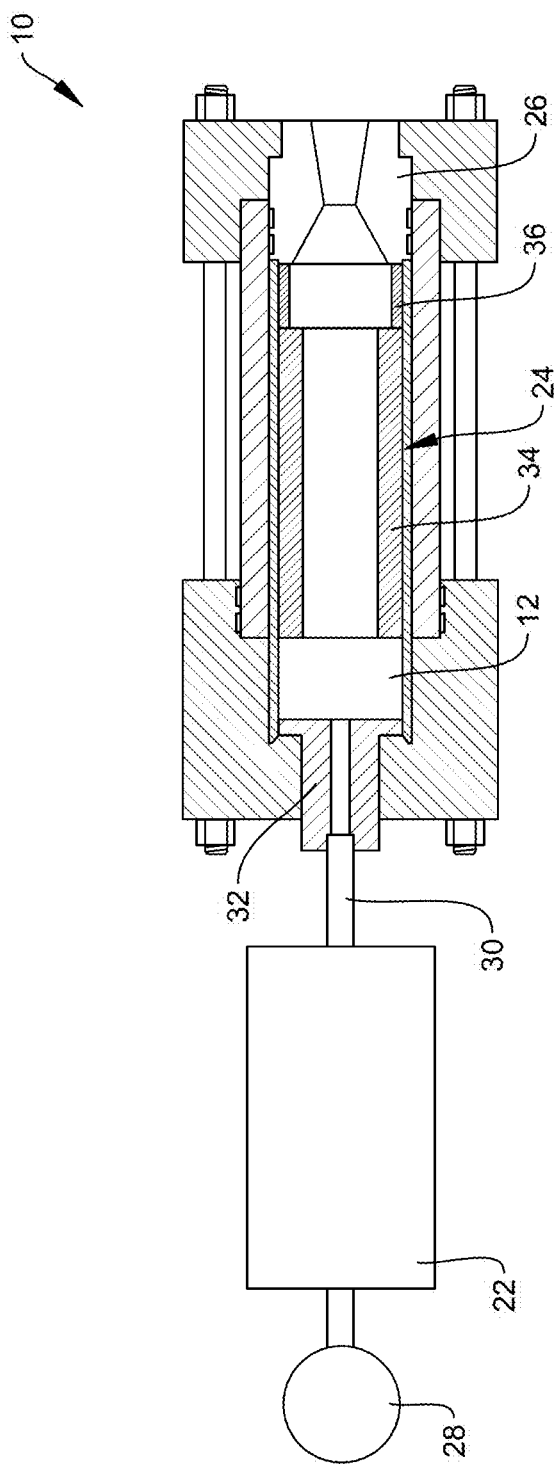
FIG. 1 is a simplified side view of a hybrid rocket system, according to one embodiment of the present invention.
Figure 6:
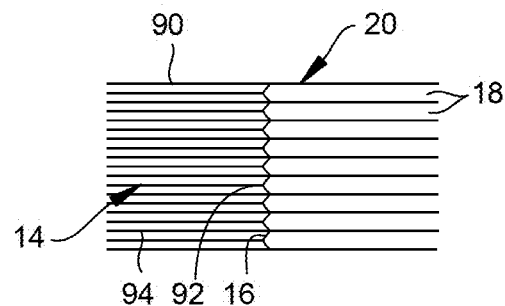
FIG. 6 is an enlarged view of detail 6 in FIG. 5, depicting ridges and grooves of the multiple layers defined in the igniter portion, according to another embodiment of the present invention.

Referring to FIGS. 1 and 2, a simplified view of a core-burn, hybrid rocket system 10 or motor that includes an ignition system 12 or pre-combustion portion, according to the present invention, is provided. Referring to FIGS. 3A, 3B, and 6, in one embodiment, the ignition system 12 or pre-combustion portion may include a housing 20 formed of multiple flat layers 18 by employing fused deposition modeling (FDM) or three-dimensional printing. Such FDM process provides an internal surface 14 with ridges 16 formed from the multiple flat layers 18 deposited upon each other (See FIG. 6). The ignition system 12 may also include electrodes 86 and 88 spaced from each other and positioned adjacent the internal surface 14. Upon an oxidizer or oxidizer being injected into the system and activating an electrical potential field between the electrodes 86 and 88, the ridges 16 along the internal surface 14 may concentrate an electrical charge which seeds combustion of the solid-grain fuel material.

As will be described herein, the unique structural characteristics of the material and structure of the internal surface 14 and housing 20 provide an ignition system 12 that is restartable. For example, multiple re-starts have been implemented with the ignition system 12 set forth herein. The inventors have found that the only limitation to the number of allowable restarts is the quantity of solid fuel grain material contained within the ignition system 12. Such ignition system 12 may require small input energy and may use only non-toxic and non-explosive with the simplicity and reliability of a monopropellant system, but with the output enthalpy equivalent to a bi-propellant igniter. As such, the restartable ignition system 12 may have applicability to military aircraft, missile systems for post-stall maneuvering, emergency gas generation cycles, and many other applications relating to systems that may benefit from the restartable ignition system.

With reference to FIG. 1, the basic components of the core-burn, hybrid rocket system 10 may include a gaseous or liquid oxidizer container 22 or tank, a combustion portion 24, and a nozzle 26. The gaseous oxidizer may be nitrous oxide or gaseous oxygen or any other suitable gaseous or liquid oxidizer. The gaseous or liquid oxidizer oxidizer container 22 may be disposed between a gas pressurization element 28 and a gas feed system 30. The gas feed system 30 may feed an injector portion 32, which in turn controllably injects oxidizer into the combustion portion 24 of the core-burn, hybrid rocket system 10. The combustion portion 24 of the system may include multiple portions, such as, the ignition system 12 or pre-combustion portion, a main combustion portion 34, and a post combustion portion 36. The main combustion portion 34 may be formed of one or more solid-grain fuels, such as acrylic or hydroxyl-terminated polybutadiene (HTPB), or any other suitable solid fuel grain known in the art. In one embodiment, the solid fuel grain for the main combustion portion 34 and post combustion portion 36 may be acrylonitrile butadiene styrene (ABS) or combinations of other known solid fuels. The combustion portion 24 and, more particularly, the post combustion portion 36 may be coupled to the nozzle 26 or other similar structure. The nozzle 26 may include various nozzle configurations, depending upon the application of a particular rocket system or the like. With this arrangement, the ignition system 12 of the present invention may be employed with the other components of the core-burn, hybrid rocket system 10 to facilitate multiple restarts with one device, i.e., without replacing parts.

Now with reference to FIGS. 2, 3 and 3A, various views of an ignition system 12 or pre-combustion portion are provided. As set forth, the ignition system 12 or pre-combustion portion may be directly coupled to the main combustion portion 34. The ignition system 12, as depicted in the illustrated example, is directly coupled to a shortened minimal portion of the main combustion portion 34. More important to this description is that the ignition system 12 or pre-combustion portion may include the housing 20 and first and second electrode components 40, 42.

In one embodiment, the housing 20 may include a sleeve like structure with various ports and notches therein and further, the sleeve like structure may include the internal surface 14 with a step configuration. For example, the housing 20 may include a first side 44 and a second side 46 with a bore 48 extending through and between the first and second sides 44, 46 of the housing 20. The second side 46 is illustrated as an interface surface between the housing 20 and main combustion portion 34. The bore 48 may define a centrally extending axis 50 along a length 52 of the housing 20. Further, the housing 20 may include an external surface 54 and the before mentioned internal surface 14. The external surface 54 may include cylindrical shape or any another suitable structure.

The internal surface 14 may define the bore 48 of the housing 20, the bore 48 defining a radial component such that a cross-section of the bore 48 may be defined as generally circular or any other suitable structure. Further, as set forth, the internal surface 14 may define a step configuration so as to include a shelf 56. In this manner, the bore 48 may include a first radius 58 and a second radius 60, the first radius 58 and the second radius 60 extending laterally from the axis 50 to the internal surface 14 of the housing 20. Such first radius 58 may extend along the length of the bore 48 from the first side 44 of the housing 20 to the shelf 56. The second radius 60 may extend along the length from the shelf 56 to the second side 46 of the housing 20. With this arrangement, the first radius 58 may be larger than the second radius 60 such that the bore 48 exhibits a larger opening on the first side 44 of the housing 20 than on the second side 46 of the housing 20.

With respect to FIGS. 2, 3, 3A, and 4, as set forth, the housing 20 may include various ports and/or notches therein. For example, in one embodiment, the bore 48 of the housing 20 may also include a first notch 62 and a second notch 64, each defined by the internal surface 14. The first and the second notches 62, 64 may be positioned on opposite sides of the bore 48 so as to face each other. Each of the first and second notches 62, 64 may extend between the shelf 56 and the first side 44 of the housing 20 such that the shelf 56 extends further at the notch to define a third radius 66 or a third dimension, the third radius 66 or dimension being larger than the first radius 58 and being defined from the axis 50 to the internal surface 14 at the first and second notches 62, 64. At least one of the first and second notches 62, 64 may be sized and configured to exhibit electrodes 86, 88 at, for example, base corners of the at least one of the first and second notches 62, 64 and adjacent the shelf 56, discussed in further detail herein.

Further, the housing 20 may include one or more ports for the electrode components. For example, the housing 20 may include a first port 68 and a second port 70. The first and second ports 68, 70 may be positioned opposite each other on the first side 44 of the housing 20. The first port 68 may define a first port cavity 72 (shown in outline form) extending from the first port 68 to a first port outlet 74. The first port outlet 74 may be disposed at a first base corner 76 of the first notch 62 on the shelf 56 and adjacent to the internal surface 14 having the third radius 66. Similarly, the second port 70 may extend with a second port cavity 78 to a second port outlet 80 at a second base corner 82 of the first notch 62 on the shelf 56. In this manner, the first port outlet 74 and the second port outlet 80 of the first notch 62 may be disposed at opposite first and second base corners 76, 82 of the first notch 62. A similar arrangement may be employed for the second notch 64 defining first and second outlets of port cavities extending to the first and second ports. In this manner, the ports and cavities extending to the first notch and/or the second notch may be sized and configured for positioning electrodes 86, 88 of the first and second electrode components 40, 42. In another embodiment, one or both of the notches, 62 or 64, or other port may include a pressure sensor configured to measure the pressure of the oxidizer at the shelf 56.

Figure 4:
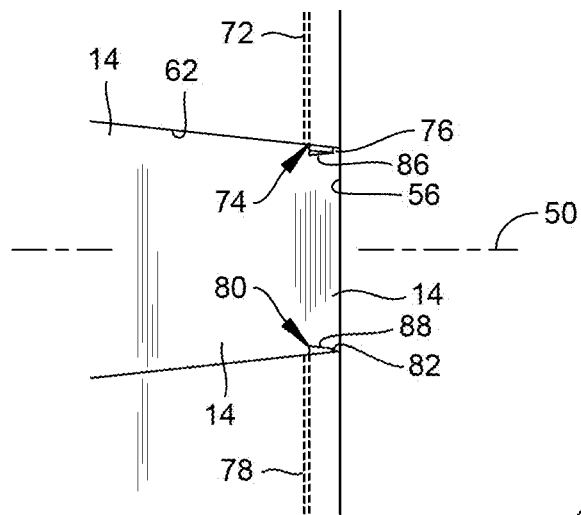
FIG. 4 is an enlarged view of detail 4 in FIG. 3A, depicting electrodes adjacent an internal surface, according to another embodiment of the present invention.

With respect to FIGS. 3A and 4, as set forth, the ignition system 12 or pre-combustion portion includes first and second electrode components 40, 42. The first and second electrode components 40, 42 may each include at least a conductive electrical wire that serves as an electrode at the end of the wire. Such electrode components may be embedded and positioned within the first and second ports 68, 70 so that respective first and second electrodes 86, 88 are exposed within the bore 48 and, more particularly at the first and second port outlets 74, 80 defined in, for example, the first notch 62. Within the bore 48, the first and second electrodes 86, 88 may be spaced a distance from each other so that, upon being electrically activated, the first and second electrodes 86, 88 provide a voltage potential or an electrical field potential adjacent the internal surface 14 between the first and second electrodes 86, 88. As depicted, such distance or spacing between the first and second electrodes 86, 88 may be defined by the first and second base corners 76, 82 in, for example, the first notch 62 in the bore 48. Further, the first and second electrodes 86, 88 may be exposed at and flush with the internal surface 14 of the bore 48. In another embodiment, the first and second electrodes 86, 88 may protrude from the internal surface 14 of the bore 48. Similar to that set forth above, another set of first and second electrodes 86, 88 may be positioned and spaced at the second notch 64.

As set forth, the housing 20 and bore 48 of this embodiment may include a step configuration to define the shelf 56. The shelf 56 may be sized and configured to act as an impingement to the oxidizer or an impingement shelf to slow the oxidizer from moving down stream so as to increase the pressure of the oxidizer at the shelf 56. The increase in pressure of the oxidizer at the shelf 56 may provide sufficient oxidizer for a combustion reaction of a solid fuel grain material on the internal surface 14. Suitable oxidizers may include gaseous oxygen, liquid oxygen, nitrous oxide, hydrogen peroxide, hydroxylammonium nitrate, ammonium dinitramide, or air. The oxidizer pressure increase at the impingement shelf 56 may enable the first and second electrodes 86, 88 to be minimally spaced (or minimally charged) to provide a charge concentration or voltage potential on the internal surface 14 of the bore 48 between the first and second electrodes 86, 88.

Figure 5:
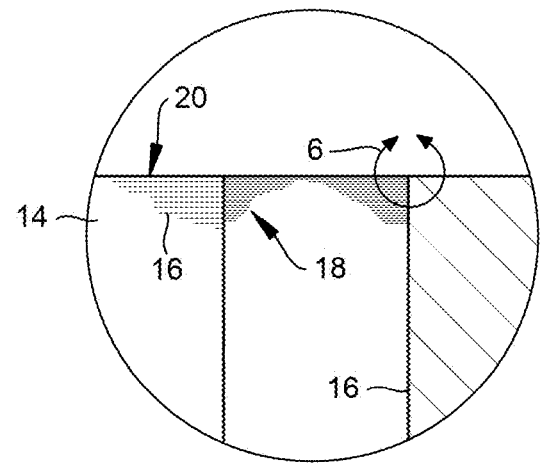
FIG. 5 is an enlarged view of detail 5 in FIG. 3B, depicting multiple layers defined in the igniter system, according to another embodiment of the present invention.

With respect to FIGS. 3B, 5, and 6, the housing 20 of the ignition system 12 may be formed from a solid-grain fuel material. In one embodiment, the solid-grain fuel material may be high or low density Acrylonitrile Butadiene Styrene (ABS) or any other suitable solid-grain fuel material that holds similar electro-mechanical, combustion, and structural properties. As set forth, the housing 20 may be formed with multiple flat layers 18 deposited upon each other, employing the Fused Deposition Modeling (FDM) method or three-dimensional printing or any other suitable process for layering a fuel grain. Upon employing the FDM method, ABS possesses a very unique electro-mechanical property such that additive manufacturing results in a distinctive surface structure that is different than the surface of a monolithically fabricated (e.g., a molded or machined) ABS structure. In particular, this surface structure, such as the internal surface 14 defining the bore 48, is the surface structure that is transverse to a plane defined by any one of the multiple flat layers 18. Such surface structure or internal surface 14 has the effect of concentrating electrical charges locally when the surface 14 of the ABS material is subjected to an electrical potential field. These high-charge concentrations produce localized electrical arcing such that the ABS material breaks down at voltages significantly lower than that of a monolithically fabricated ABS structure. Described another way, the voltage potential created between the first and second electrodes 86, 88, when electrically activated, causes the unique features (the ridges 16 formed in the multiple flat layers 18 shown in FIG. 6) of the surface 14 to act as micro-electrodes which ignites the solid-grain fuel material in the presence of an oxidizer.

In one embodiment, the multiple flat layers 18 may be deposited so that any one of the flat layers 18 define a plane that is transverse or perpendicular with the axis 50 of the housing 20. In another embodiment, the first and second electrodes 86, 88 (see FIG. 4) may define a line therebetween that may be generally parallel with a plane defined by each of the multiple flat layers 18. In still another embodiment, each of the flat layers 18 may define a plane that is substantially parallel with the axis 50 of the housing 20. In any one of these embodiments, the multiple flat layers 18, deposited upon each other, form the internal surface 14 with ridges 16 or ridged layering. The ridges 16 or ridged layering may be defined by peripheral ends 90 of the multiple flat layers 18. As set forth, the unique mechanical structure (e.g., the surface characteristics created by the FMD layering) of the ridges 16 and multiple flat layers 18, in conjunction of the material being a solid-grain fuel, such as ABS material, act as multiple micro-electrodes when subjected to an electrical potential field. Such unique mechanical structure facilitates the ignition system 12 to implement multiple restarts. For example, even as material from the internal surface 14 is initially consumed or removed through combustion, a newly exposed internal surface 14 maintains similar surface characteristics or surface roughness that act as micro-electrodes when exposed to an electrical potential field.

With respect to FIG. 6, an enlarged view of the multiple flat layers 18 and ridges of the fuel grain material are depicted. As set forth, the internal surface 14 defines ridges or ridged layering formed between each of the multiple flat layers 18. Each of the flat layers 18 may include a peak 92 with a small radius at its peripheral end such that the structure may also include a slope extending to the peak that may be substantially linear or radial. Although depicted as uniform ridges 16, such ridges may not be uniform along the internal surface 14 of the housing 20. In this manner, the internal surface 14 may exhibit a rough, coarse or scratched surface. The ridges may exhibit a nodal configuration or exhibit a protruding structure that may continue or discontinue along the peripheral end 90 of each of the multiple flat layers 18. Likewise, the internal surface 14 may exhibit grooves 94 formed between each of the multiple flat layers 18. In other words, each groove 94 extends between adjacently extending ridges 16. With this arrangement, the FDM technique of forming the housing, preferably with ABS material, provides for a unique electro-mechanical structure such that the flat layers 18 that exhibit the ridges 16 and/or grooves 94 therein reacts to an electrical potential field. In this manner, the structure and material itself act as multiple micro-electrodes, thereby, facilitating electrical breakdown to facilitate a restartable ignition for a hybrid rocket system.

Figure 7:
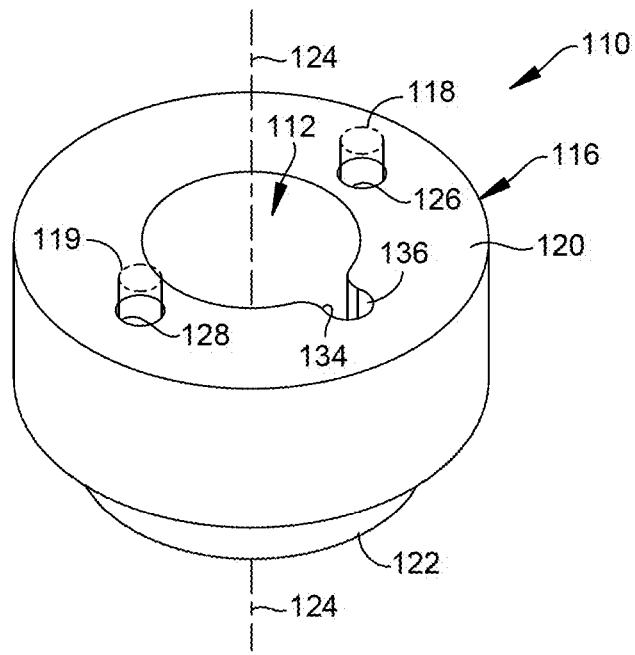
FIG. 7 is a perspective view of another embodiment of an igniter system, according to the present invention.
Figure 8A:
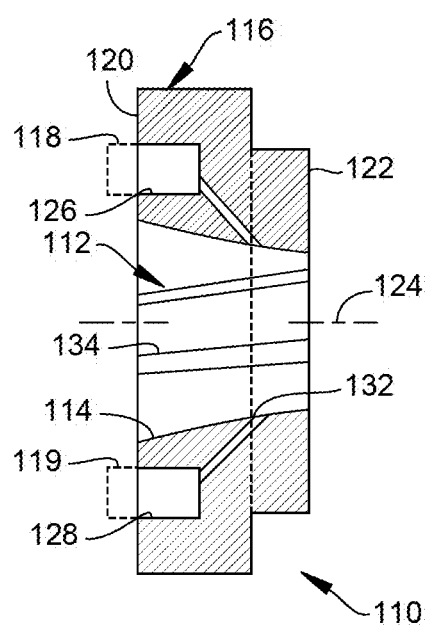
FIG. 8A is a cross-sectional view of the igniter system taken along section 8A of FIG. 8, according to another embodiment of the present invention.
Figure 8:
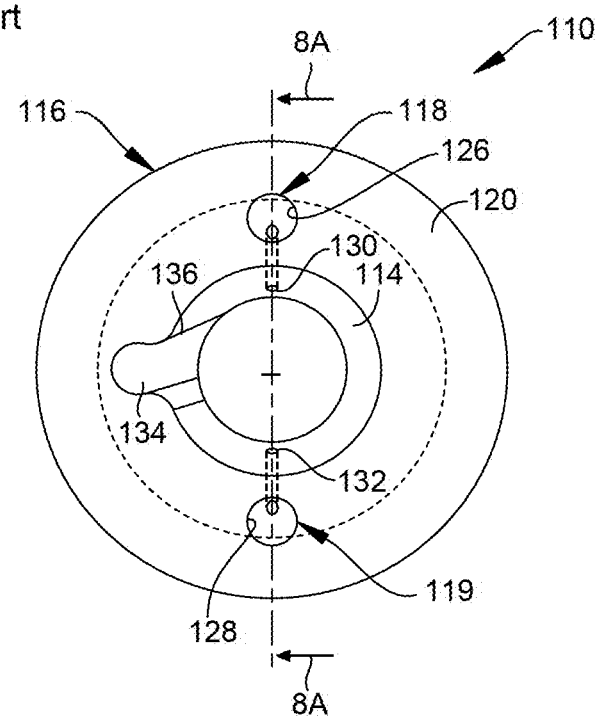
FIG. 8 is a top view of the igniter system of FIG. 7, according to another embodiment of the present invention.

With respect to FIGS. 7, 8, and 8A, another embodiment of an ignition system 110 for a core-burn, hybrid rocket system 10 (FIG. 1) is provided. This embodiment is similar to the previous embodiment, except this embodiment exhibits a bore 112, defined by an internal surface 114, with a convergent or conical configuration. For example, the ignition system 110 may include a housing 116 and first and second electrode components 118, 119. The housing 116 may include a first side 120 and a second side 122 with the bore 112 extending through and between the first and second sides 120, 122. The bore 112 may define a centrally located axis 124 extending along the length of the housing 116. The housing 116 may include first and second electrode ports 126, 128 that may extend from the first side 120 to a convergent portion of the bore 112 so that a first and second electrode 130, 132 may be exposed within the bore 112. The housing 116 may also include a pressure port 134 with a corresponding pressure sensor 136 so that a pressure within the bore 112 may be determined upon receiving the oxidizer.

Similar to that described and depicted in FIG. 6 of the previous embodiment, the housing 116 of this embodiment may be formed with multiple flat layers 18 that exhibit a roughened surface or ridges 16 that provide the before-discussed unique structural characteristic along the internal surface 114 of the conical bore 112. In this manner, upon the first and second electrodes 130, 132 being activated to provide an electrical potential field, the multiple flat layers 18 deposited upon each other and exhibiting the ridges 16 and/or grooves 94 react and concentrate a charge, thereby, acting as multiple micro-electrodes at the internal surface 114 of the bore 112.

As set forth in this embodiment, the bore 112 in the housing 116 is convergent. The bore 112 may be sized and configured to converge so as to increase the pressure of the oxidizer as it moves downstream through the bore 112. The increase in pressure of the oxidizer as it moves downstream through the bore 112 may provide sufficient oxidizer for a combustion reaction of a solid fuel-grain material on the internal surface 114. Suitable oxidizers may include gaseous oxygen, liquid oxygen, nitrous oxide, hydrogen peroxide, hydroxylammonium nitrate, ammonium dinitramide, or air. The oxidizer pressure increase at the narrower portion of the bore 112 may enable the first and second electrodes 130, 132 to be minimally spaced (or minimally charged) to provide a charge concentration or voltage potential on the internal surface 114 of the convergent portion of the bore 112 between the first and second electrodes 130, 132.

Similar to previous embodiments, the multiple flat layers 18, deposited upon each other, form the internal surface 114 with ridges 16 or ridged layering. The unique mechanical structure (e.g., the surface characteristics created by the FMD layering) of the ridges 16 and multiple flat layers 18, in conjunction of the material being a solid-grain fuel, such as ABS material, act as multiple micro-electrodes on the internal surface 114 when subjected to an electrical potential field. Such unique mechanical structure facilitates the ignition system 116 to implement multiple restarts. For example, even as material from the internal surface 114 is initially consumed or removed through combustion, a newly exposed internal surface 114 maintains similar surface characteristics or surface roughness that act as micro-electrodes when exposed to an electrical potential field from charged electrodes 130, 132.

Low-Thrust Hybrid Rocket Motors.

The hybrid propulsion system may use various plastics such as, for example, ABS, PMMA, PVC, or Nylon-12 as fuel, and gaseous oxygen (GOX) as the oxidizer. Other high-density oxidizers such as hydrogen peroxide ($H_2O_2$) and nitrous oxide ($N_2O$) may also be used. These oxidizers provide several advantages, including, for example, benign handling properties, simplified plumbing, and greater characteristic velocities over traditional monopropellants.

A high voltage arc, when placed on the surface of Acrylonitrile butadiene styrene (ABS) plastic, may result in fuel vaporization along the conduction path. This principle led to the development of several lab-weight thrusters varying in thrust from approximately 4-900 N. A 5 N system was successfully demonstrated on a suborbital sounding rocket. During this flight demonstration, the system was fired 5 times with each firing lasting 5 seconds. These successful tests led an investigation of the possibility of filling the current CubeSat market technology gap with this same technology by miniaturizing the ABS-based hybrid rockets to levels less than or equal to 1 N.

Conventional hybrid rocket motors with thrust levels greater than 5 N rely on forced convection within the boundary layer as the primary heat transfer mechanism for fuel regression. Because of convective heat transfer, the rate of fuel regression is proportional to the oxidizer mass flux through the fuel port. For core-burn motors, as the fuel port burns radially outwards along the motors longitudinal axis, the rate of fuel regression results from oxidizer diffusion into the combustion layer between the inward blowing vaporized fuel and the axially flowing oxidizer. For a constant oxidizer mass flow, the associated mass flux and the fuel regression rate decrease with burn time. As the fuel port opens up, more surface burn area is exposed, and the resulting oxidizer-to-fuel ratio shifts during the burn from a balance between the fuel regression rate drop, and the increased surface burn area. Generally, the effects of forced convection tend to make hybrid motors burn from rich-to-lean over the burn lifetime.

Figure 9:
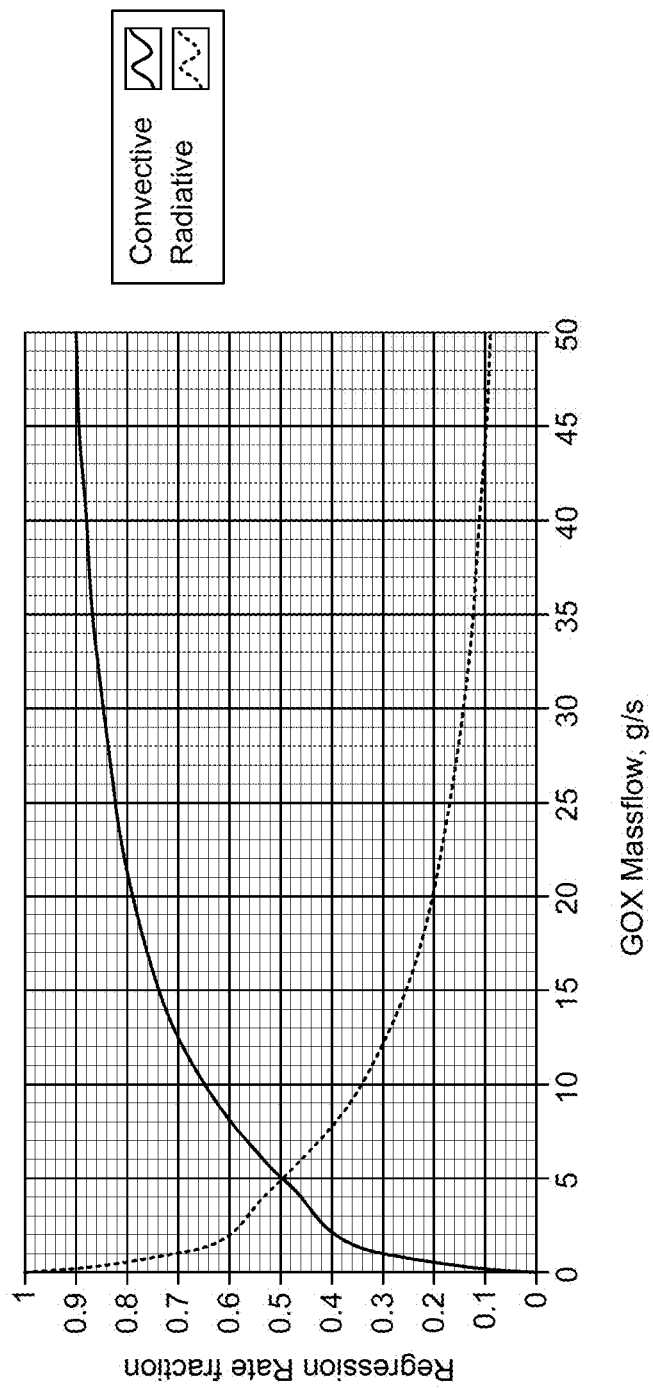
FIG. 9 is graph showing the influence of radiative and convective heat transfer at different oxidizer mass flow levels.

For Hybrid rockets with thrust levels less than 1 N, e.g., low-thrust hybrid rocket motors, oxidizer mass flow levels are sufficiently small that the rate of convective heat transfer is significantly reduced, and radiative heat transfer dominates the fuel regression mechanism. FIG. 9 shows how hybrid rockets with lower oxidizer mass flow levels are dominated by radiative heat transfer as compared to higher oxidizer mass flow levels being dominated by convective heat transfer. This issue is associated with the miniaturization of hybrid rockets and has yet to be fully understood, but generally the fuel regression rate tends to grow with time. These small hybrid motors have exhibited a lean-to-rich burn behavior.

Figure 10:
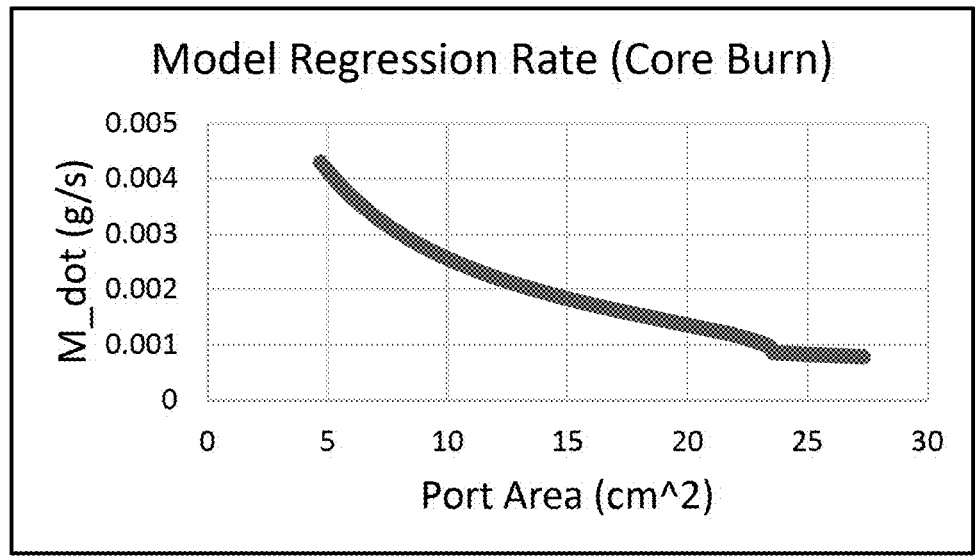
FIG. 10 is a graph illustrating the Marxman model fuel mass consumption, M_dot (g/s), as a function of port area, or combustion surface area in $cm^2$, of a core-burn rocket motor.

Marxman and Gilbert developed a model to calculate the fuel mass consumption as a function of combustion surface area (the "Marxman" model). See Marxman, G. and M. Gilbert, "Turbulent boundary layer combustion in the hybrid rocket," Symposium (International) on Combustion, Vol. 9, No. 1., 1963, pp. 371-383. The Marxman model is based on a "forced convection" analysis to make its predictions. The Marxman model uses geometry of the fuel (port diameter) and the oxygen flow rate anticipated in a test and predicts regression rate (g/s). FIG. 10 is a graph illustrating the fuel mass consumption, M_dot (g/s), as a function of port area, or combustion surface area in $cm^2$, of a core-burn rocket motor. The Marxman model predicts that for a combustion surface area in the range of five to 30 $cm^2$, the estimated fuel mass consumption is between 0.0005 and 0.005 g/s.

Merkley adapted the Marxman model by adding a radiative heat value to estimate fuel mass consumption in core-burn hybrid rocket motors capable of producing between five and 900 N (the "Merkley" model). See Merkley, "Effects of Radiation Heating on Additively Printed Hybrid Fuel Grain Oxidizer-to-Fuel Ratio Shift," Master's Thesis, pg. 33, Utah State University, 2016. Merkley concluded that his "proposed augmented radiation-corrected Marxman model matches fuel mass consumption and port diameter expansion within reasonable percentages (2-10% deviation) with the exception of the smaller length-to-diameter (L/D) ratio motor configuration (S38 mm)—actually being described more accurately via the classic Marxman model instead." Id. at 41 and 48-49.

Figure 11:
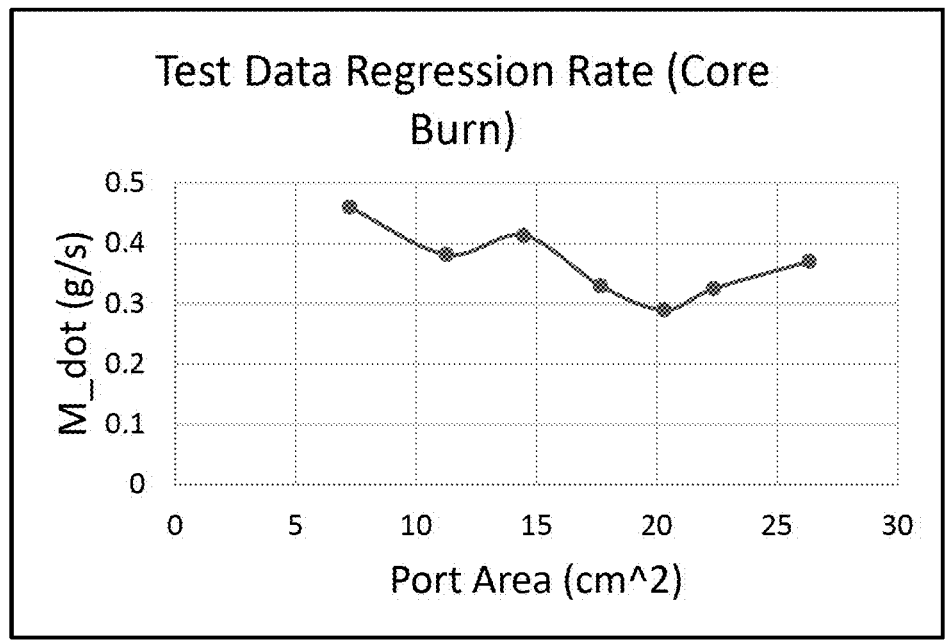
FIG. 11 is a graph illustrating lab results of a core-burn rocket motor.

Inventors of the present disclosure tested the fuel mass consumption of a core-burn hybrid rocket motor with a fuel-grain length measuring 3.0 cm and a diameter the same as Merkley's S38 mm (which had a fuel-grain length of 6.812 cm and a diameter of 3.8 cm; Inventors' motor had an L/D ratio of 0.79). The results of Inventor's test are shown in FIG. 11. The graph illustrates lab results of a fuel mass consumption rate of between 0.46 and 0.29 g/s in a port area between 7 and 26 $cm^2$.

In comparing the Marxman model to the Inventors' lab results, the Marxman model predicted mass flow rates two orders of magnitude lower than the lab experiments such that the lab experiments were actually much more fuel rich. The results indicate that combustion in low-thrust hybrid rockets is dominated by radiative heating, not convective heating, and that the Marxman and Merkley models were insufficient at predicting fuel mass consumption for low-thrust regions.

This fuel-rich tendency leads to combustion inefficiencies (e.g., very low specific impulse or Isp) in the scales necessary to achieve useful thrust levels for small satellites (e.g., less than 5 N), meaning it is difficult to make a core-burn hybrid rocket motor small (or short) enough and still have a useable motor. For example, a hybrid rocket motor following the Marxman or Merkley models would need to be larger and less efficient than Inventors' design to achieve a sub-Newton thrust level.

Figure 12:
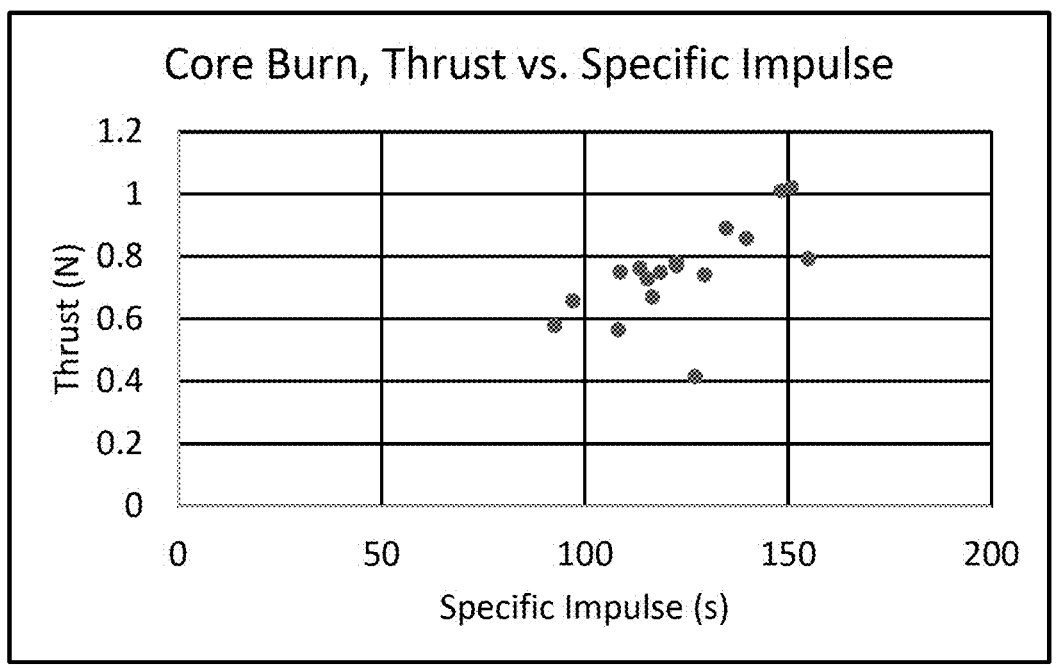
FIG. 12 is a graph showing test data from an end-burning motor in another embodiment of the present invention.

However, Inventors developed a 3 cm-long, core-burn hybrid rocket with thrust levels between 0.5 and 1.2 N with a specific impulse greater than 100 seconds. FIG. 12 is a graph illustrating the results of Inventors' testing of a core-burn rocket motor achieving an Isp greater than 100 seconds with a thrust level between 0.4 and 1 N.

An End-Burn Hybrid Rocket Motor

As a solution to provide constant fuel regression rate at these desired low thrust levels, an example hybrid rocket device was redesigned to be end-burning, resulting in a constant regression rate and oxidizer-to-fuel ratio throughout the burn lifetime. This device provides an end-burning hybrid thruster in the sub-Newton scale. The description below relates to the design and testing results of this hybrid propulsion system at various thrust levels (e.g., 0.3 N and 1 N).

Figure 13:
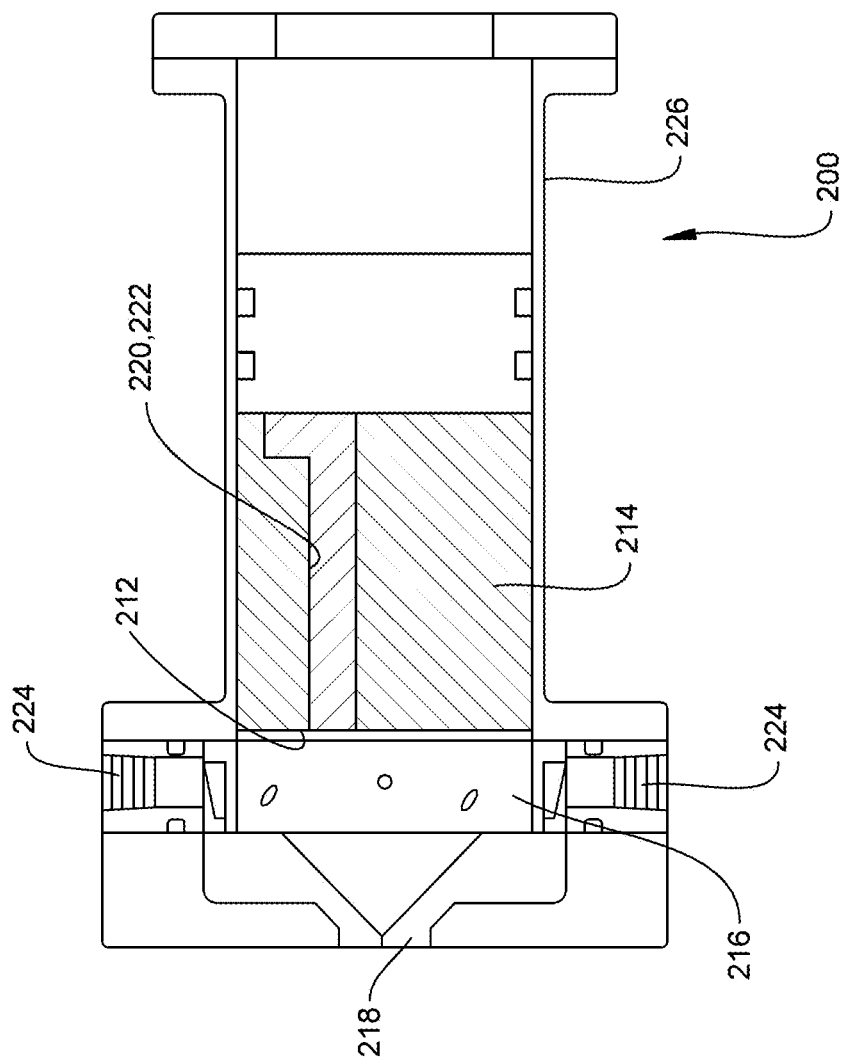
FIG. 13 is a cross-sectional side view of an example hybrid rocket system in another embodiment of the present invention.

An end-burn configuration of a hybrid rocket system 200 (shown in FIG. 13), deemed the Augmented Swirling Injection (ASI) end-burn motor, was designed to increase the flow of oxidizer across a fuel surface 212 of a fuel gran 214 and to maintain a constant O/F ratio. The combustion chamber 216 is located at the end of the fuel grain 214, and lies in between the fuel grain 214 and the nozzle 218. The electrodes 220, 222 run through the length of the fuel grain 214 and terminate flush with the combustion chamber 216 surface allowing for fuel vaporization. The oxidizer is injected at four ports 224 to induce a swirling internal flow, effectively increasing the mixing of the oxidizer with the vaporized fuel in the housing 226. A side view of the end burn design is shown in FIG. 13.

Figure 14:
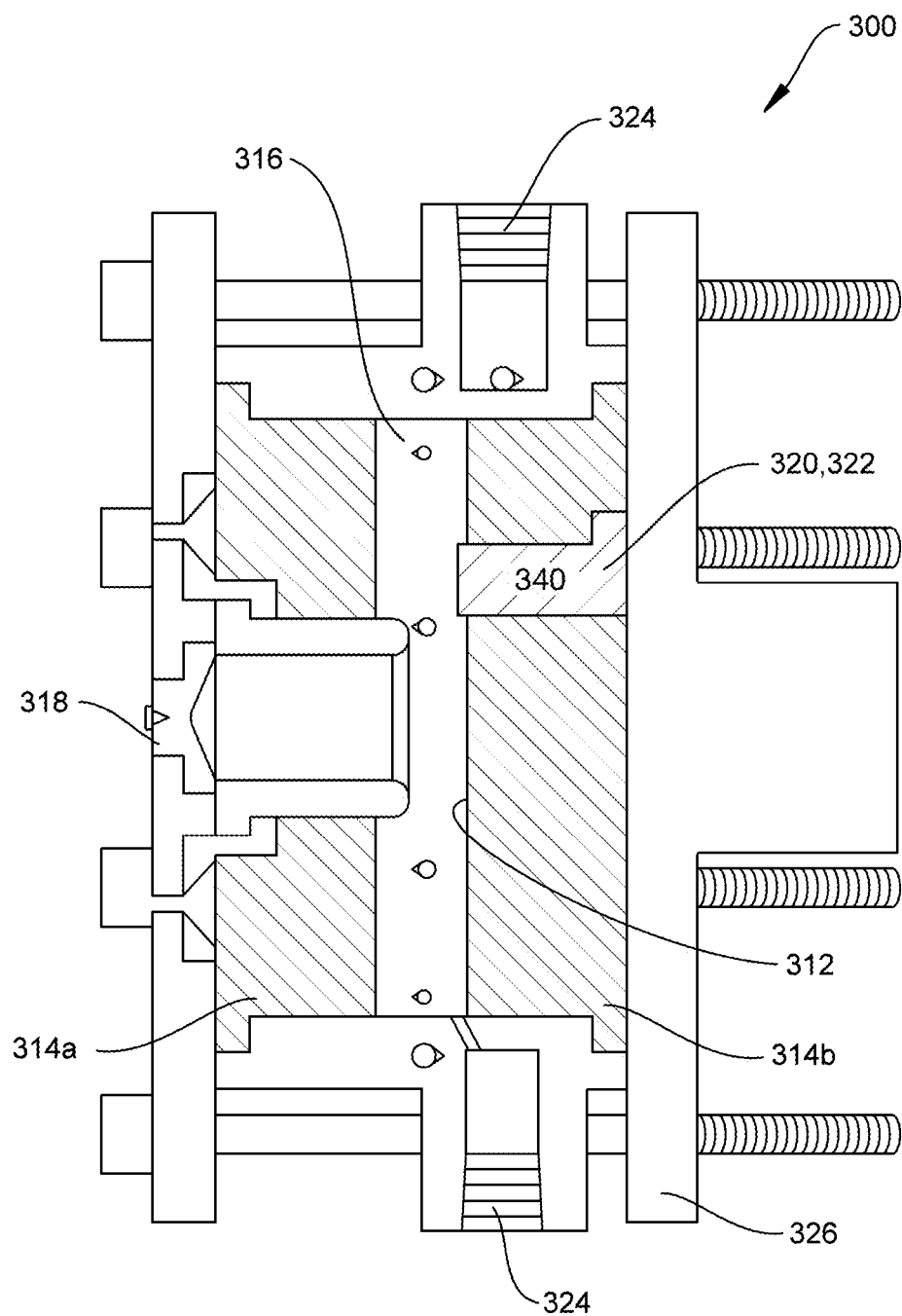
FIG. 14 is a cross-sectional side view of another example hybrid rocket system in another embodiment of the present invention.

An alternative configuration, referred to as a "sandwich" configuration of an end-burn hybrid rocket system 300 (shown in FIG. 14) was designed to increase the flow of oxidizer across the fuel surface 312 of a pair of fuel grains 314a, 314b and to maintain a constant O/F ratio. The combustion chamber 316 is located between the two fuel grains 314a, 314b, with one fuel grain 314a bumping up against the nozzle 318 and the other fuel grain 314b containing the electrodes 320, 322. Similar to the ASI end-burn configuration 200, the oxidizer is injected at eight ports 324 around the housing 326 to induce a swirling internal flow. The electrodes 320, 322 once again run through the length of the fuel grains 314a, 314b and terminate flush with the combustion chamber 316 surface allowing for fuel vaporization. A side view of the end burn design is shown in FIG. 14.

One object of the hybrid rocket system 300 is to minimize the area of the thruster housing 326 exposed to the combustion chamber 316 with the goal of minimizing heat loss to the housing 326. The reduction in heat loss increased combustion efficiency and fuel packing efficiency beyond what was demonstrated by the rocket system 200.

An issue found during testing of the system 200 was the reliability of the arc ignition system, including the electrodes 220, 222. While using ABS as the fuel, the arc path was repeatedly covered with the vaporized but unburned fuel, leading to subsequent ignition failure. The unreliable ignition of ABS required an investigation into other plastics to use as the fuel, including, for example, Nylon-12, PMMA (Acrylic), and PVC. These fuels were selected based on an initial analysis using the NASA software package Chemical Equilibrium with Applications (CEA). The CEA analysis indicated favorable combustion properties over the use of ABS. Table I shows each fuel type and the key performance metrics used to select the final fuel.

TABLE I

Fuel Grain Performance

| Fuel Type | Average C* (m/s) | Average Rise time (sec) | Number of Ignitions observed |
| --- | --- | --- | --- |
| ABS | 895 | 2.18 | 6 |
| Nylon-12 | 860 | 2.56 | 17 |
| PMMA | 1022 | 1.86 | 30 |

Testing of ABS showed that in at least some situation it lacked the ability to provide repeatable ignitions. The motor had to be disassembled after each ignition to clean the carbon from the electrodes. Due to the low observed variable C* and the carbon present on the electrodes after a test, it was determined that the ABS combustion was incomplete in at least some tests.

Figure 15:
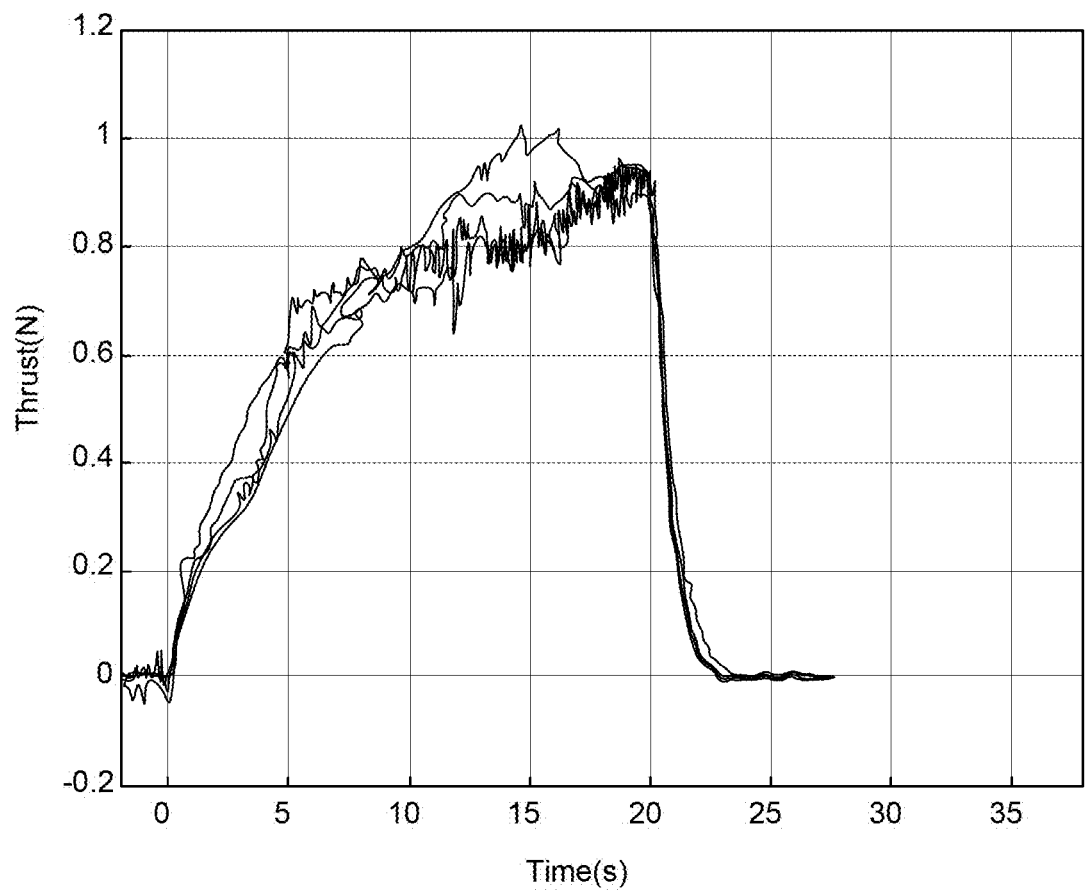
FIG. 15 is graph showing a thrust profile of an end-burn motor in another embodiment of the present invention.

Nylon-12 was used in several burn tests and was initially found to have better ignition reliability than ABS. However, the Nylon fuel would soften and flow during a test, which caused ignition failure in some scenarios and, in some cases, blocked the injector port. The regression rate in Nylon-12 was also found to have a major dependence on the bulk fuel temperature, leading to a long motor rise time as shown in FIG. 15 (Thrust profile of 1 N End-Burn motor using GOX and Nylon 12).

Testing with PVC revealed a material compatibility issue between the exhaust products and the graphite nozzle, leading to nozzle erosion and failure. A single 15 second test would produce sparks in the exhaust plume and erode the throat of a new graphite nozzle. Testing with PVC indicated that no further evaluation was required to determine its merit as a desirable fuel.

PMMA exhibited a reduced regression rate as compared to ABS, and therefore had a reduced tendency to coat the electrodes in soot. Table I shows that PMMA had the greatest C* value, which indicates a more efficient combustion process when compared to ABS and Nylon-12. Because of the reduced deposition of soot on the electrodes during each test, a greater number of consecutive ignitions was achieved. PMMA also has a higher melting point so it did not deform during extended duration burns. These favorable traits surrounding PMMA led to it being selected as another desirable fuel.

Testing the arc ignition system with these plastics found that ABS was probably the most reliable of the plastics tested. The other plastics usually initiated an arc path but failed soon after in subsequent ignition attempts. This led to a common design of having a relatively small segmented portion of the primary fuel grain containing ABS as the ignition system. This mitigated the above-mentioned ignition failure using only ABS. As a result, PMMA with an ABS ignition segment was one of the preferred motor configuration. The ABS ignition segment 340 is illustrated as the area between electrodes 320, 322 in FIG. 14.

Two motors with different diameters of the ASI end-burning motor were tested. FIGS. 16A-D (0.5 N×4.1 cm Diameter End-Burning Motor Test Data from twenty-seven 5-second burns with GOX and PMMA) shows the results from over twenty burns of the 4.1 cm diameter 0.5 N motor, while FIGS. 17A-D (1 N×7.5 cm Diameter End Burning 1N Motor Test Data from twenty-seven 5-second burns with GOX and PMMA) shows the results from over twenty burns of the 7.5 cm diameter 1 N motor. The chamber pressure, thrust, and ignition power were directly measured by the test stand, while vacuum thrust was calculated from these and the measured oxidizer mass flow rates.

Table II shows the calculated average Isp and the extrapolated average Vacuum Isp for each ASI end-burn configuration. The Isp was calculated over the entire duration of the burn accounting for both the rise time and the tail-off time of the motor. The low Isp of the ASI configurations is a direct result of an incorrect oxidizer-to-fuel ratio, which is controlled through both the geometry of the motors and the total injected oxidizer.

TABLE II $I_{sp}$ for 4.1 cm and 7.5 cm End Burning Motors

| Fuel Grain Diameter | Average Calculated Ambient $I_{sp}$ (sec) | Average Extrapolated Vacuum $I_{sp}$ (sec) |
|---|---|---|
| 4.1 cm | 115 | 162 |
| 7.5 cm | 100 | 133 |

Figure 18:
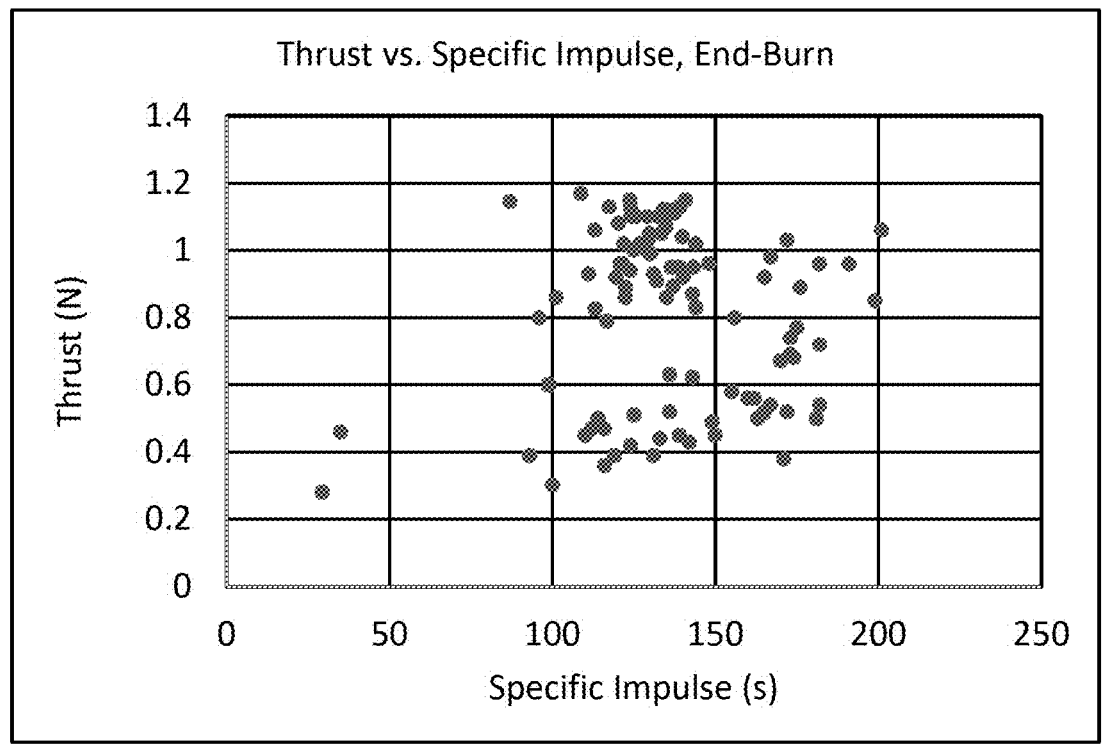
FIG. 18 is a graph showing test data from an end-burning motor in another embodiment of the present invention.
Figure 19:
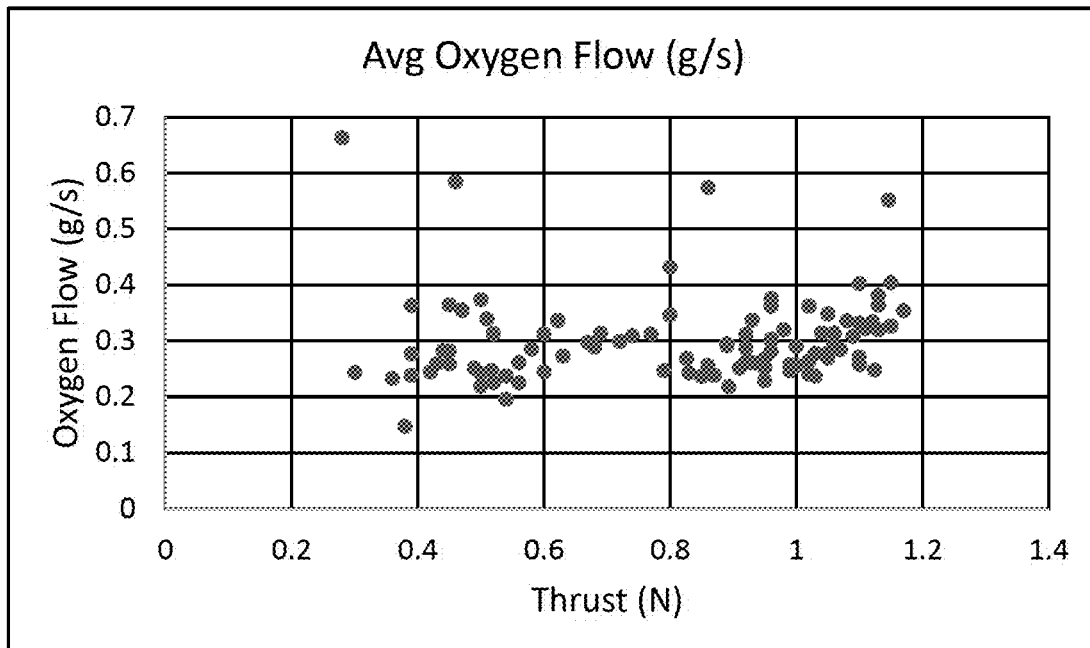
FIGS. 19 and 20 are graphs showing test data from an end-burning motor in another embodiment of the present invention.

FIG. 18 illustrates the thrust compared to the specific impulse of the end-burn hybrid rocket motors. Inventors were able to successfully fire the end-burn rocket motors and achieve a thrust as low as 0.3 N with an Isp greater than 100 seconds.

Figure 16:
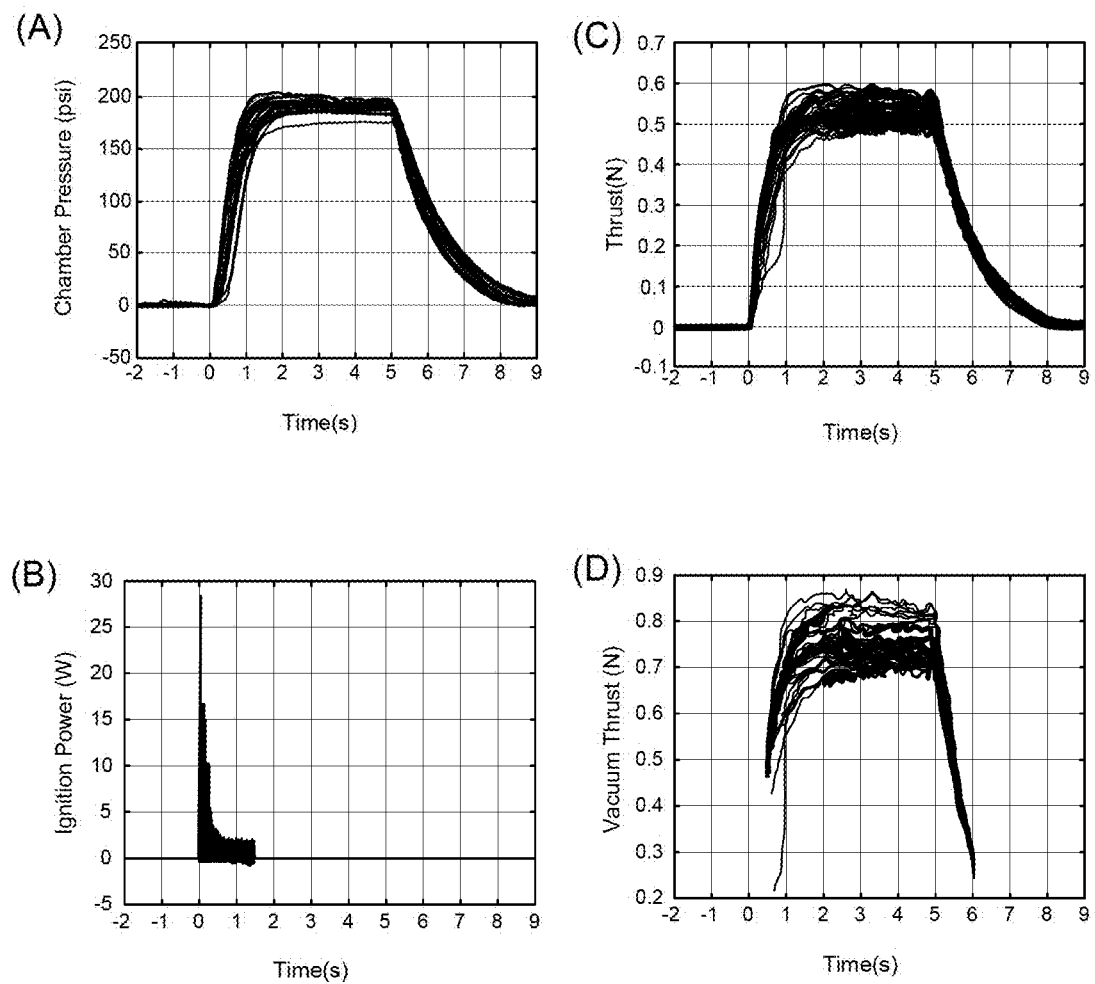
FIGS. 16A, 16B, 16C, and 16D are graphs showing test data from an end-burning motor in another embodiment of the present invention.
Figure 17:
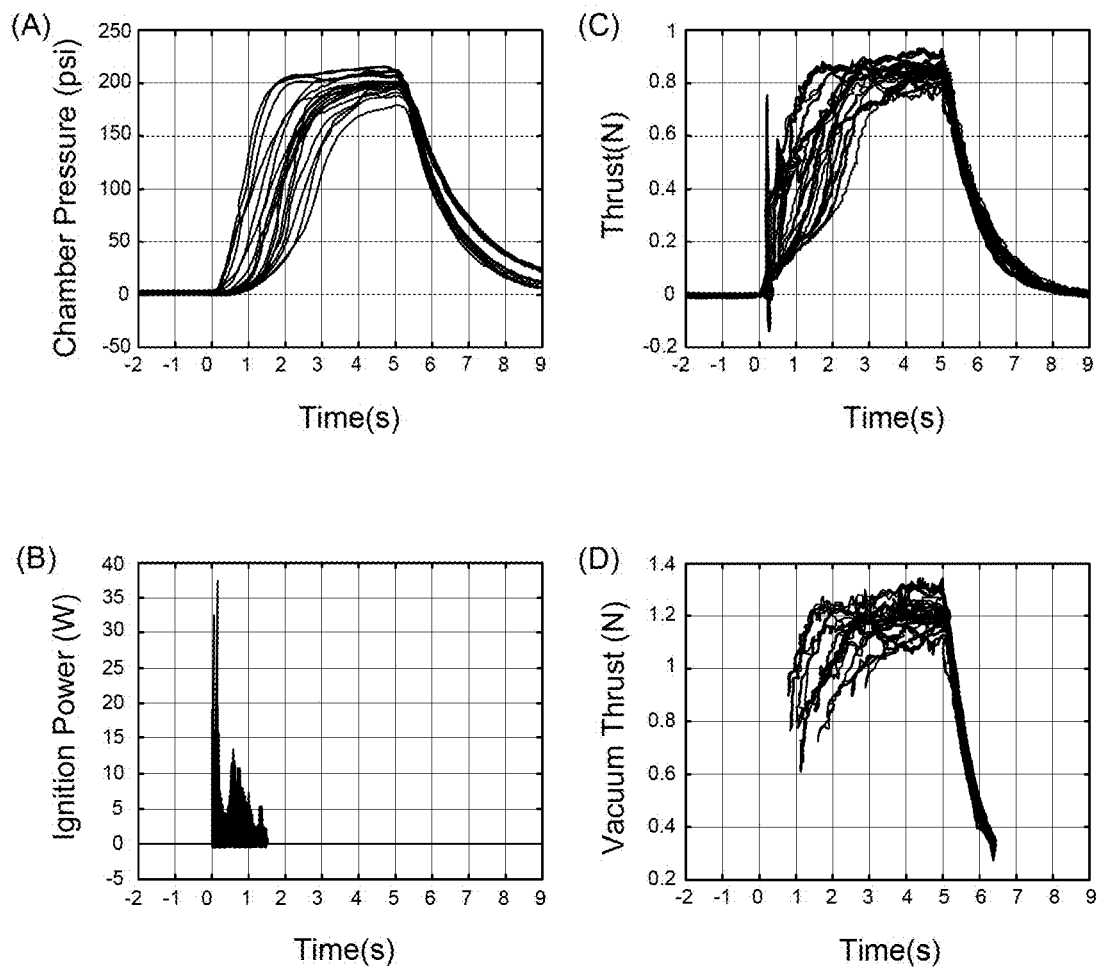
FIGS. 17A, 17B, 17C, and 17D are graphs showing test data from an end-burning motor in another embodiment of the present invention.
Figure 21:
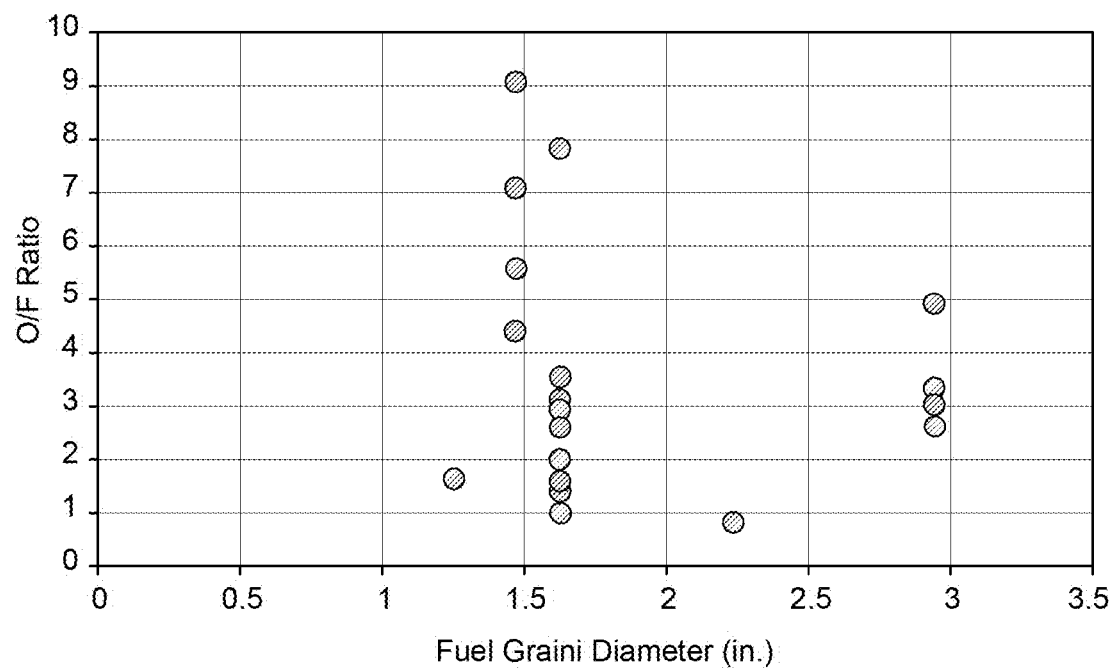
FIG. 21 is graph showing the O/F ratio for each end burning motor diameter in another embodiment of the present invention.

The ignition characteristics are similar for each test as shown in FIGS. 16 and 17. The chamber pressure, thrust, and Isp are not as similar between each burn, and may vary widely. These performance variations relate to the variation in the oxidizer to fuel (O/F) ratio. FIG. 21 (Comparison of O/F ratios at different fuel grain diameters) shows the O/F ratio for each end burning motor diameter.

The O/F ratio tended to slightly increase with the diameter of the fuel grain. However, the overall inconsistencies in the O/F ratio and Isp suggest that combustion may be incomplete in these end burning configurations.

Figure 20:
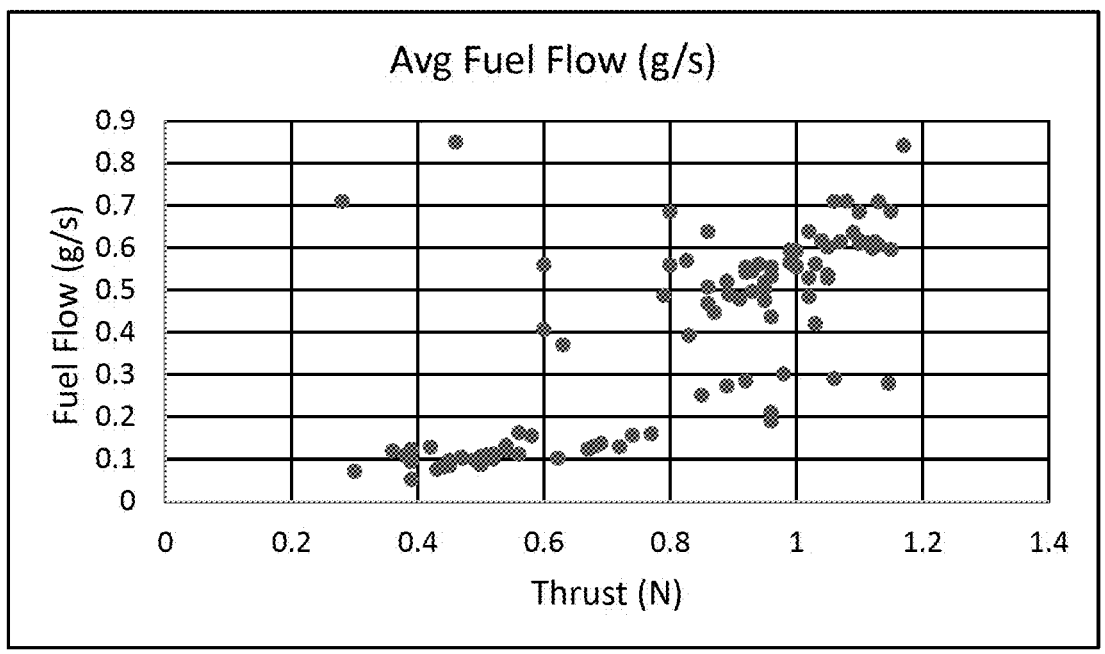
Figure 22:
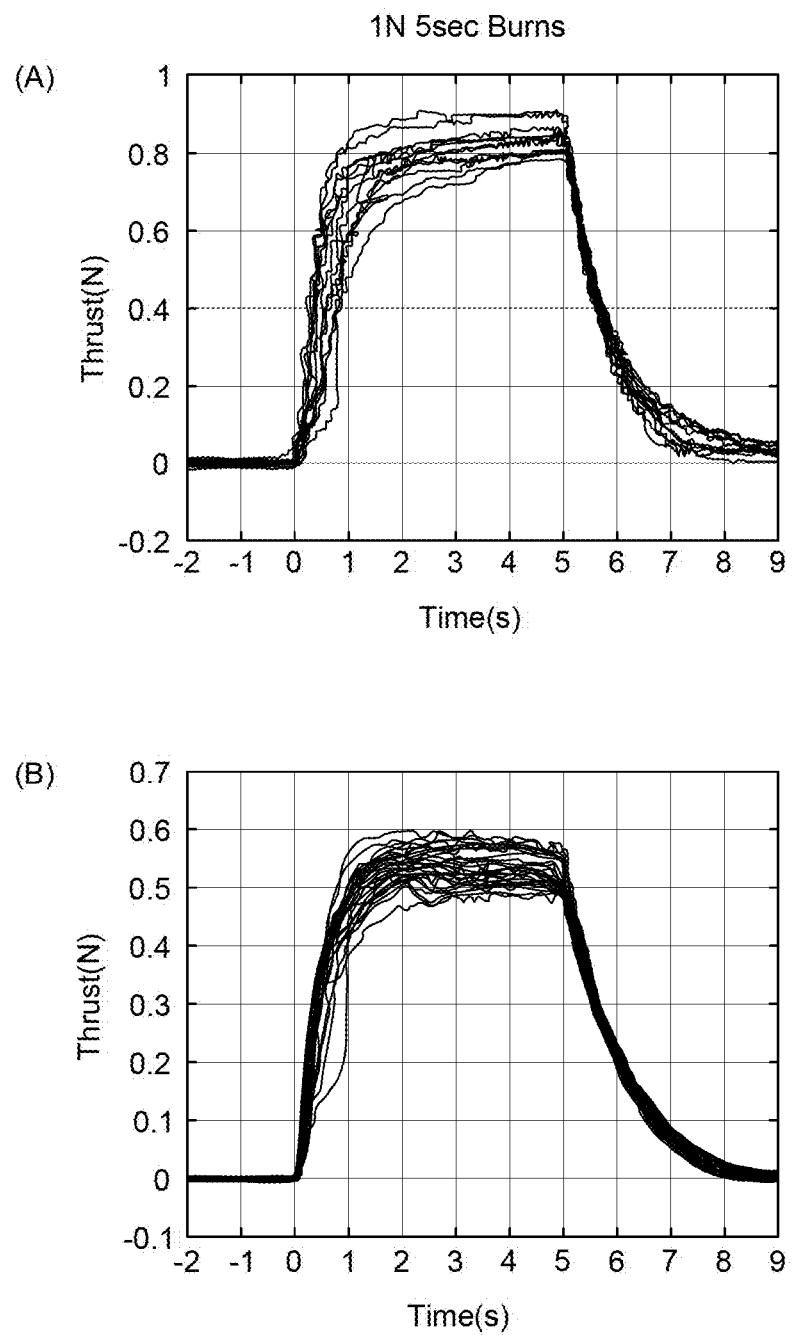
FIGS. 22A and 22B are graphs showing thrust profiles of the core burn and end burn motors in another embodiment of the present invention.
Figure 23:
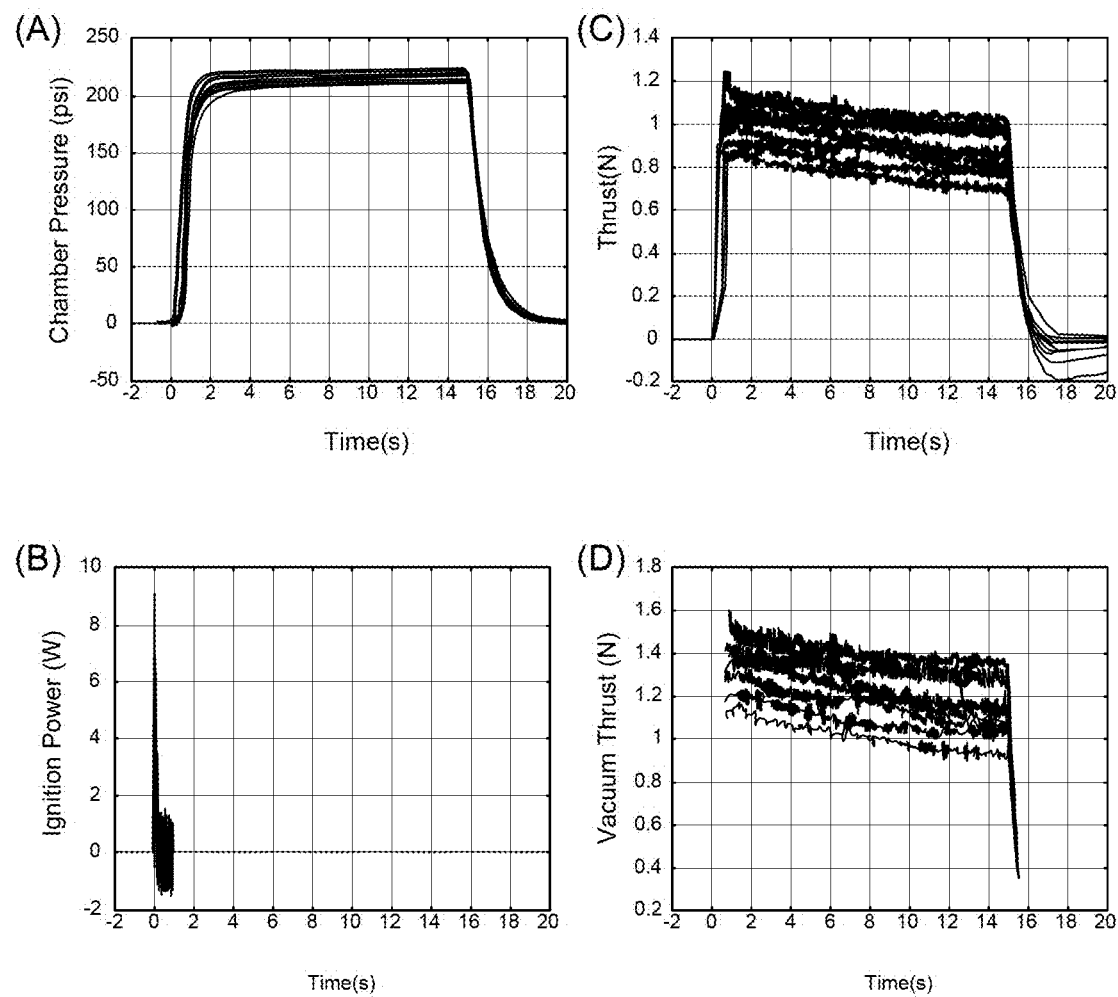
FIGS. 23A, 23B, 23C, and 23D are graphs showing test data from a sandwich configuration of an end-burning motor in another embodiment of the present invention.

A comparison with a more traditional core burn configuration is shown in FIGS. 20A-B (Comparison of thrust profiles of core burn (a) and end-burn (b) motors). The core and end burning motors performed similarly to each other at the 1 N scale. A key difference is the change in the O/F ratio. The core burn motors were extremely fuel rich, while the end burning motors were oxidizer rich. The end burning motors successfully produce a more constant burn area and thrust level during steady state when compared to the core burning motors. There was limited notable difference in the Isp between the core burn and end-burn configurations. FIGS. 22A-B show a comparison of the thrust profiles of the core burn and end burn motors.

It was also discovered that a large amount of heat loss to the motor case occurred on a burn-to-burn basis. This heat loss directly stripped away from the combustion enthalpy, which explained much of the difference between the performance predicted by CEA and performance actually measured. Initial tests tracking the motor case temperature estimated that about 20%-40% of the enthalpy released in combustion was present as heat in the case at the end of a test, rather than being used to increase the chamber stagnation temperature. Two methods to try to mitigate this heat loss were developed and reached initial testing:

Method 1: Insulate the case from the combustion chamber with a high temperature ceramic.

Method 2: Change to a "sandwich" geometry, with the combustion chamber located between two end-burn surfaces.

Insulating the case brought the challenge of determining a suitable insulation material. Several ceramics were investigated with the common properties of withstanding high temperatures, resisting oxidizing environments, and having relatively low thermal conductivity. Some initial testing was done by modifying the end burn motors to include a ceramic insulator.

A "sandwich" end burn motor was also built and tested. One object of this approach was to minimize the area of the thruster case exposed to the combustion chamber and increase the fuel packing efficiency. Initial tests of this motor were promising showing an increase in Isp by about 23% over an end-burn configuration of the same thrust level. FIGS. 23A-D ("Sandwich" configuration showing 13×15-second burns with GOX and PMMA) show the results from the sandwich motor testing.

The heat present in the case was also reduced, averaging about 12% of the combustion energy over the tests performed. The thrust rise time also improved from greater than 1 second (e.g., FIG. 16A, FIG. 17A) to about 350 msec. These changes also improved the ignition reliability. Table III shows the average calculated Isp and the extrapolated vacuum Isp for the "Sandwich" configuration. Again, the specific impulse was calculated over the total duration of the burn including the rise time and tail-off time of the motor.

TABLE III

"Sandwich" End Burning Motor Isp

| Motor | Average Calculated Ambient $I_{sp}$ (sec) | Average Extrapolated Vacuum $I_{sp}$ (sec) |
|---|---|---|
| "Sandwich" | 127 | 169 |

The propulsion systems disclosed herein take advantage of radiative heating, which traditionally had impeded the use of hybrid rockets as a propulsion system in the 1 N class. The analysis of various benign fuel grains paired with gaseous oxygen showed that these systems are capable of producing a vacuum Isp of greater than 150 seconds and a thruster rise time of less than 350 msec. Other high-density oxidizers such as hydrogen peroxide and nitrous oxide are expected to further increase the performance of these end-burning hybrid motors. In at least some embodiments, the ratio between the thrust and oxidizer flow rate is fixed for any given propellant combination and ambient conditions (i.e., vacuum optimized nozzle verses atmospheric optimized nozzle), but other operating conditions and losses change the ratio. For example, for ABS and GOX in vacuum, one scenario produces about 5 N using about 0.97 g/s Oxygen, or about 1 N using about 0.20 g/s Oxygen. There may be similar values for PMMA/GOX. When using HTP or $N_2O$ instead of GOX, there may be an increase in the oxidizer flow for a given thrust. In another example, the 1 N PMMA/GOX motor consumes about 0.6-0.7 g/s of gaseous oxygen.

Figure 24:
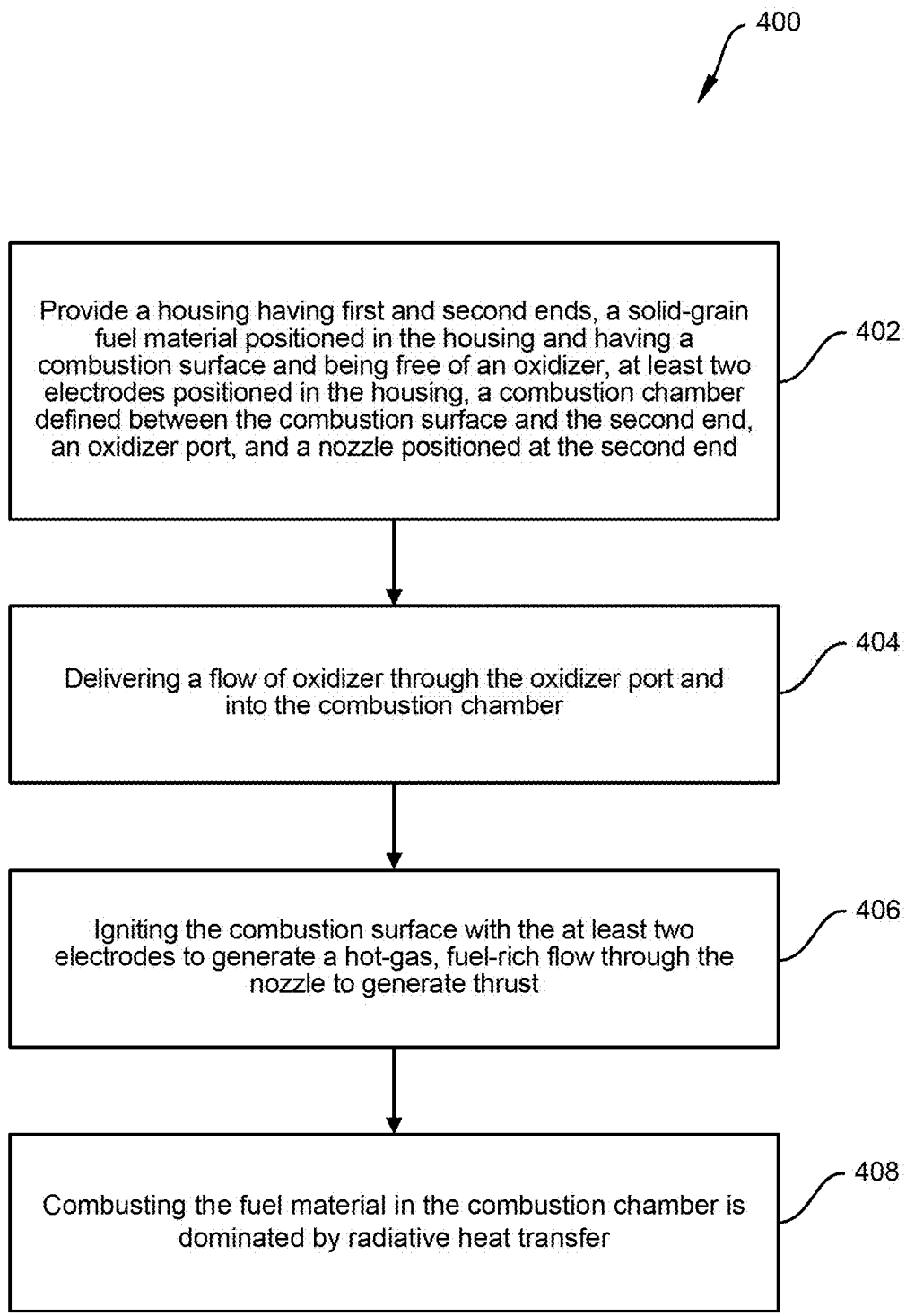
FIG. 24 is a flow chart showing steps of an example method related to the present invention.

FIG. 24 is a flow chart showing steps of an example method 400 in accordance with the present disclosure. The method 400 may represent one method of use of one or more of the systems 200, 300 and represent a method that is operable to generate any of the test data shown in FIGS. 12-17 and/or Tables I-III disclosed herein.

The method 400 may include, at 402, providing a housing having first and second ends, a solid-grain fuel material positioned in the housing and having a combustion surface and being free of an oxidizer, at least two electrodes positioned in the housing, a combustion chamber defined between the combustion surface and the second end, an oxidizer port, and a nozzle positioned at the second end. At 404, the method 400 includes delivering a flow of oxidizer through the oxidizer port and into the combustion chamber. At 406, the method includes igniting the combustion surface with the at least two electrodes to generate a hot-gas, fuel-rich flow through the nozzle to generate thrust. At 408, the method includes combusting of the fuel material in the combustion chamber being dominated by radiative heat transfer.

The method 400 may further include generating thrust in the range of about 0.1 N to about 1 N. The method 400 may include generating no more than about 1 N of thrust and having oxidizer flow of no more than about 1 g/s. The fuel material may include a plurality of flat layers that provide ridges along the combustion surface, and the electrodes may be configured to concentrate an electrical charge on the ridges, which act as micro-electrodes that produce localized electrical arcing thereon and ignite the combustion surface of the fuel material. The fuel material at the combustion surface may initially be consumed or removed through combustion of the fuel material, and a newly exposed internal surface of the fuel material may have newly exposed ridges that act as newly exposed micro-electrodes that produce localized electrical arcing thereon and re-ignite the newly exposed combustion surface.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

We claim:

1. A low-thrust, end-burn hybrid propulsion system, comprising:
   a housing having a first end and a second end and defining a cavity;
   at least two electrodes extending into the cavity;
   a solid-grain fuel material free of an oxidizer, positioned in the cavity at the first end, and exposed to the at least two electrodes, the solid-grain fuel material having an end-burning combustion surface;
   a single combustion chamber defined between the end-burning combustion surface and the second end;
   an oxidizer port extending through the housing and arranged to provide a flow of an oxidizer into the single combustion chamber;
   a nozzle positioned at the second end;
   wherein the single combustion chamber is configured to combust the solid-grain fuel material and the oxidizer in a manner dominated by radiative heat transfer at an operating pressure of at least 150 PSI at a steady-state thrust between 0.3 and 1.2 N.

2. The end-burn hybrid propulsion system of claim 1, wherein the second end is a second end-burning combustion surface positioned against the nozzle.

3. The end-burn hybrid propulsion system of claim 1, wherein the solid-grain fuel material comprises Polymethyl methacrylate (PMMA) and the at least two electrodes extend into the cavity through an Acrylonitrile Butadiene Styrene (ABS) segment.

4. The end-burn hybrid propulsion system of claim 1, wherein the oxidizer is gaseous oxygen (GOX), hydrogen peroxide ($H_2O_2$), or nitrous oxide (N2O).

5. The end-burn hybrid propulsion system of claim 1, wherein the solid-grain fuel material comprises at least one of Acrylonitrile Butadiene Styrene (ABS), Polymethyl methacrylate (PMMA), Polyvinyl Chloride (PVC), and Nylon-12.

6. The end-burn hybrid propulsion system of claim 1, wherein the hybrid propulsion system uses at steady state no more than about 1 g/s oxidizer.

7. The end-burn hybrid propulsion system of claim 1, wherein combustion of the solid-grain fuel material in the combustion chamber generates a steady state thrust of no more than about 1 N at a steady-state oxidizer flow rate of no more than about 1 g/s and a steady state solid-grain fuel consumption of no more than about 1 g/s.

8. A method of operating a low-thrust, end-burn, hybrid propulsion system, the method comprising:
   providing a housing having first and second ends, a solid-grain fuel material free of an oxidizer and positioned in the housing at the first end and the second end, the solid-grain fuel material having an end-burning combustion surface at the first end and the second end, the first end-burning combustion surface facing the second end-burning combustion surface, at least two electrodes running through a length of the solid-grain fuel material and exposed to the second end-burning combustion surface, a combustion chamber defined between the first end-burning combustion surface and the second end-burning combustion surface, an oxidizer port extending through the housing and into the combustion chamber, and a nozzle positioned at the first end;
   delivering a flow of oxidizer through the oxidizer port and into the combustion chamber;
   igniting the first end-burning combustion surface and the second end-burning combustion surface with the at least two electrodes to generate a hot-gas, fuel-rich flow through the nozzle to generate thrust;
   wherein combustion of the solid-grain fuel material in the combustion chamber is dominated by radiative heat transfer at a steady state operating pressure of at least 150 PSI and is capable of producing a steady-state thrust between 0.1 and 1.2 N.

9. The method of claim 8, wherein the end-burn hybrid propulsion system has a steady state oxidizer flow of no more than about 1 g/s.

10. The method of claim 8, wherein the end-burn hybrid propulsion system produces a specific impulse of at least 100 seconds.

* * * * *